(12) United States Patent
Schopp

(10) Patent No.: US 10,849,172 B2
(45) Date of Patent: Nov. 24, 2020

(54) SYSTEM, METHOD AND COMPUTER PROGRAM PRODUCT FOR IMPLEMENTING BLUETOOTH IN A VIRTUAL MOBILE DEVICE PLATFORM

(71) Applicant: Intelligent Waves LLC, Reston, VA (US)

(72) Inventor: Joel Howard Schopp, Austin, TX (US)

(73) Assignee: Intelligent Waves LLC, McLean, VA (US)

( * ) Notice: Subject to any disclaimer, the term of this patent is extended or adjusted under 35 U.S.C. 154(b) by 162 days.

(21) Appl. No.: 15/886,365

(22) Filed: Feb. 1, 2018

(65) Prior Publication Data

US 2018/0220472 A1    Aug. 2, 2018

Related U.S. Application Data

(60) Provisional application No. 62/460,424, filed on Feb. 17, 2017, provisional application No. 62/453,866, filed on Feb. 2, 2017.

(51) Int. Cl.

| | |
|---|---|
| H04W 76/10 | (2018.01) |
| H04L 29/08 | (2006.01) |
| G06F 9/455 | (2018.01) |
| H04L 29/06 | (2006.01) |
| H04L 9/32 | (2006.01) |
| G06F 9/451 | (2018.01) |
| H04W 12/00 | (2009.01) |
| H04L 9/08 | (2006.01) |
| H04W 4/80 | (2018.01) |
| H04W 12/06 | (2009.01) |

(52) U.S. Cl.
CPC ......... *H04W 76/10* (2018.02); *G06F 9/452* (2018.02); *G06F 9/45558* (2013.01); *H04L 9/0816* (2013.01); *H04L 9/3213* (2013.01); *H04L 63/0428* (2013.01); *H04L 63/08* (2013.01); *H04L 67/10* (2013.01); *H04L 67/145* (2013.01); *H04W 12/0027* (2019.01); *G06F 2009/45579* (2013.01); *G06F 2009/45595* (2013.01); *H04L 63/20* (2013.01); *H04L 2209/80* (2013.01); *H04W 4/80* (2018.02); *H04W 12/06* (2013.01)

(58) Field of Classification Search
None
See application file for complete search history.

(56) References Cited

U.S. PATENT DOCUMENTS

| | | | |
|---|---|---|---|
| 8,798,541 B1 * | 8/2014 | Scott ................... | G06F 9/45545 455/41.2 |
| 2007/0025389 A1 * | 2/2007 | Garg ................... | H04L 43/0811 370/449 |
| 2014/0287733 A1 * | 9/2014 | Mach ................ | H04W 52/0258 455/418 |
| 2015/0081764 A1 * | 3/2015 | Zhao ....................... | H04L 67/08 709/203 |

* cited by examiner

*Primary Examiner* — Eric C Wai
(74) *Attorney, Agent, or Firm* — Pillsbury Winthrop Shaw Pittman LLP

(57) ABSTRACT

Embodiments are disclosed that allow data to be sent between a BLUETOOTH® enabled device and a virtual device associated with a corresponding physical device. In particular, embodiments of a virtual mobile device system may include one or more components for processing BLUETOOTH® calls where these components may process received BLUETOOTH® calls in a first manner in a connected state and process BLUETOOTH® calls in a disconnected state in a second manner.

14 Claims, 9 Drawing Sheets

SYSTEM, METHOD AND COMPUTER PROGRAM PRODUCT FOR IMPLEMENTING BLUETOOTH IN A VIRTUAL MOBILE DEVICE PLATFORM

RELATED APPLICATION(S)

This application claims a benefit of priority under 35 U.S.C. § 119 from U.S. Provisional Patent Application No. 62/460,424 filed on Feb. 17, 2017, by inventor Joel Howard Schopp, entitled "SYSTEM, METHOD and COMPUTER PROGRAM PRODUCT FOR IMPLEMENTING BLUETOOTH IN A VIRTUAL MOBILE DEVICE PLATFORM," and U.S. Provisional Patent Application No. 62/453,866 filed on Feb. 2, 2017, by inventor Joel Howard Schopp, entitled "SYSTEM, METHOD and COMPUTER PROGRAM PRODUCT FOR SECURE BLUETOOTH CRYPTOGRAPHY IN A VIRTUAL MOBILE DEVICE PLATFORM," the entire contents of which are hereby fully incorporated by reference herein for all purposes.

TECHNICAL FIELD

This disclosure relates generally to a virtual mobile device platform for mobile devices. In particular, embodiments disclosed herein relate to a systems, methods, and computer program products for communications in a virtual mobile device platform. More specifically, embodiments disclosed herein relate to systems, methods and computer program products for implementing BLUETOOTH® communications in a virtual mobile device platform.

BACKGROUND

Today's mobile devices such as smart phones and tablets face unique security issues, some of which go hand in hand with mobility. Enterprises, military, and intelligence agencies (collectively referred to herein as "organizations") are all grappling with their users' use of mobile devices as many users are carrying out both business as well as personal activities on their mobile devices. This can be problematic, even if a Bring Your Own Device ("BYOD") device policy is in place.

BYOD can raise serious security issues when a user's personal device is used to access both non-sensitive and sensitive (and sometimes risky) networks and/or services. For example, if an employee uses his personal smartphone to access a company network and then loses that phone, untrusted parties could retrieve any unsecured data on the phone. Another type of security breach occurs when an employee leaves a company, she does not have to give the company back her personal device, so company-owned applications and other data may still be present on her personal device. A challenging but important task for organizations that utilize BYOD is to develop a policy that defines exactly what sensitive company information needs to be protected and which employees should have access to this information, and then to educate all employees on this policy. Commercial carriers are normally relied upon for implementing the security requirements of an organization's BYOD policy.

Because of Internet-based risks, some very risk-averse organizations issue devices specifically for Internet use (this is termed "Inverse-BYOD"), providing unfiltered access to the Internet and reserving filtered, sensitive network data for use within a secured, private network. However, this means that a user likely has to carry multiple devices (including one for his personal use) and organizations do not have a sure way of preventing the user from using his personal mobile device to communicate non-sensitive but company-related information. As such, organizations continue to search for solutions that allow mobile services to be delivered or shared within a single device, rather than having to issue their users multiple devices or separate devices for their personal use and locking them into private networks.

Finding viable solutions to handle mobile devices can be particularly challenging for organizations that operate in high assurance computing environments. A high assurance computing environment is one that provides a certain level of assurance as to its behavior, useful in ensuring a level of secrecy for classified information. For instance, a high assurance operating system may permit only certain certified applications to access a particular portion of a memory on a device where sensitive information is stored. However, this does not prevent the physical device itself to become suspect—how it was built, who has handled it from manufacturing through use, how it is used by the user, etc. Moreover, the device could be physically accessed or otherwise compromised in many ways. For instance, information stored or cached on a mobile device could be accessed while its owner is away (e.g., left on the table at a restaurant or on their desk at work, stolen, or lost) or the user may have downloaded an infected application or could be sent an infected document via email or instant messaging, or accessed an infected service.

Because a mobile device lives in a hostile world, securing the physical device itself (e.g., via Tempest hardware, encrypted storage, biometrics, etc.) is not enough and can be very expensive to do a thorough job. Even so, infiltration from any portion of the stack—from the chips to the software that is installed to the data the device receives—still leaves the device vulnerable to attacks from well-funded, motivated, adversaries. Attempts to provide the level of separation needed within the actual device face many challenges, and at best are likely to become a very expensive niche proposition in the overall commercial mobility ecosystem.

In view of unique challenges in incorporating mobile devices such as smart phones and tablets into secure computing environments, there is room for innovations and improvements.

SUMMARY

Embodiments as disclosed herein provide a system, method, and computer program product for generating remote views in a virtual mobile device platform. In some embodiments, events from a physical mobile device are sent to a virtual device. The virtual device creates one or more views based on the received events. Graphical attributes of one or more of the created views are captured and sent to the physical mobile device. Remote views are constructed and displayed on the physical mobile device based on the attributes received from the virtual device. For views where graphical attributes are not captured, compressed video of the respective views can be sent to the physical mobile device. Embodiments disclosed herein can provide many advantages. For example, in some embodiments, generating remote views using graphical attributes improves the security of mobile devices.

However, the generation of these remote views using a virtual mobile device platform brings up a whole host of issues related to the management and synchronization of the physical device and the virtual mobile device platform. A microcosm of these problems manifests in the use of BLUETOOTH® enabled peripheral devices (e.g., devices operating according to Classic BLUETOOTH®, BLUETOOTH® High Speed, BLUETOOTH® Low Energy or other BLUETOOTH® implementations) in association with the physical device. As is known in the art, applications on physical devices may connect and communicate with a BLUETOOTH® enabled device (e.g., using the BLUETOOTH® radio on the devices). As will be explained in more detail at a later point herein, in the context of a virtual mobile device platform it is the applications which may actually be executing on the virtual mobile device platform that will be communicating with the BLUETOOTH® enabled device or BLUETOOTH® library on the mobile device.

In other words, BLUETOOTH® Application Programming Interface (API) calls (referred to herein also as a "BLUETOOTH® call" or as a "call") may be issued by an application executing on the virtual mobile device platform. These calls (or equivalent requests or calls) may be passed over a communication network (such as a LAN, a WAN, a VPN, the Internet, cellular phone network, etc.) to the physical mobile device where they can be issued to the local BLUETOOTH® library on the physical mobile device such that these BLUETOOTH® calls issued by applications on the virtual mobile device platform can be implemented with respect to the BLUETOOTH® library on the physical mobile device. Similarly, BLUETOOTH® calls issued by the Bluetooth enabled device may be received at the BLUETOOTH® library at the physical mobile device and passed to the virtual mobile device platform over the communications network, where they may be provided to the application executing on the virtual mobile device platform. In this manner, an application executing on the virtual mobile device platform may communicate with, and utilize, a BLUETOOTH® enabled device in association with the physical mobile device.

There are therefore one or more components of the virtual mobile device platform that facilitate these communications between the application on the virtual mobile device platform and the physical mobile device for implementation of BLUETOOTH® in the virtual mobile device platform. Applications executing on a virtual device platform and BLUETOOTH® enabled devices may, however, be standard applications and devices (e.g., they may not be modified from their implementation in a non-virtualized architecture). These applications and devices may thus be configured to respond to BLUETOOTH® calls within a certain time frame, or may be configured to behave as if previously issued calls were actually performed or received by the BLUETOOTH® library to which they were issued.

This configuration may present problems when such applications or devices are utilized in the context of a virtual mobile device platform or system. In particular, the problem thus arises that the disruption of communications between the virtual mobile device platform and the physical device may prove problematic, both to these facilitating components, and other components, of each of the BLUETOOTH® endpoints (e.g., the virtual mobile device platform, physical device or BLUETOOTH® enabled device). As noted, the physical device may be a mobile device. Accordingly, the communications network used to communicate between the physical device and the virtual mobile device platform may be comprised of, or have portions comprised of, the Internet, a cellular network, a LAN, a WAN, etc. Disruptions to these types of networks are not uncommon. For example, the mobile device may travel to an area with spotty or unreliable cellular network coverage; the communications network may be temporarily disconnected as the mobile device moves from a wireless IP network to a cellular network or as the mobile device is transitioned between cellular communication towers; or for a wide variety of other reasons.

When the communication network between the virtual mobile device platform and the physical device is disrupted or loses connectivity it is problematic, as loss of connectivity over the communication network between the virtual mobile device platform and the physical device disrupts the ability of the components of the virtual mobile device system to communicate BLUETOOTH® calls between the physical device and the virtual mobile device platform. It is thus desired that the components of the virtual mobile device system have some manner of gracefully dealing with the inability to deliver such BLUETOOTH® calls between the physical mobile device and the virtual mobile device platform. In particular, it is desired that such connectivity issues are dealt with in a manner that is as transparent as possible to the various components of the physical mobile device and virtual mobile device platform (e.g., BLUETOOTH® enabled devices and applications executing on the virtual mobile device platform, BLUETOOTH® implementations implemented at a device or platform, etc.).

To those ends, among others, embodiments of the virtual mobile device system may include one or more components for processing BLUETOOTH® calls where these BLUETOOTH® components may process received BLUETOOTH® calls in a first manner in a connected state and process BLUETOOTH® calls in a disconnected state in a second manner. In particular, when these BLUETOOTH® components are in a connected state, a received BLUETOOTH® call may be sent over a communication network used to communicate between the virtual mobile device platform and the physical device. If the BLUETOOTH® components are in a disconnected state, the BLUETOOTH® call may be processed based on whether the disconnected state is a temporarily disconnected state or a permanently disconnected state.

In one embodiment, a connectivity state may be maintained or determined by the BLUETOOTH® components based upon, for example a heartbeat between the components over the communication network or a threshold number of network errors or dropped packets on the communication network. When a BLUETOOTH® call is received at a BLUETOOTH® component, if there is no connectivity between the components the BLUETOOTH® call may be placed in a buffer with an associated timer designating a temporary disconnection period. The duration of the timer may, for example, be dependent on the type of call, or may be the same for each type of call. In one embodiment for example, the temporary disconnection period for the timer may be based on an amount of time it would take to implement the call if the call were being issued by an application executing on a physical mobile device in a non-virtualized context.

If connectivity on the communication network is reestablished before the expiration of the timer associated with the call, the call may be sent to the corresponding BLUETOOTH® component (e.g., the BLUETOOTH® component associated with a destination for the call) across the communication network. If connectivity is not established within the temporary disconnection period (e.g., before the expiration of the timer) for the call, the connection is considered permanently disconnected with respect to that call. Here, an action may be taken for the call in a permanently disconnected state. This action may be to return an error in response to the call (e.g., in response to the original call), return success in response to a call or to return a response to the call with a status.

It will be noted that the call has not actually been sent to the other BLUETOOTH® endpoint and carried out, thus the response returned may indicate an occurrence or status to the caller in a return, despite that the call was never actually communicated or performed. As such, in some embodiments, there may be one or more actions with respect to a permanently disconnected command that it is desirable to take whenever connectivity is reestablished over the communication network. Accordingly, when an action is taken with respect to a permanently disconnected call, such as the retuning of a particular status, a corresponding action (e.g., that it is desired to take when connectivity is reestablished) may be entered into an action queue.

When connectivity is re-established between the BLUETOOTH® components, the BLUETOOTH® components on the physical mobile device and the virtual mobile device platform may be synchronized such that the BLUETOOTH® components include the same state with respect to the BLUETOOTH® connections or sockets currently open. Pending BLUETOOTH® calls for any connections or sockets (generally referred to interchangeably herein) may then be sent. In one embodiment, the calls for a particular connection may be reconciled such that the calls for that connection may be evaluated to determine, based on the set of calls if one or more of the set of calls can be discarded as being obviated by a call in the set of calls that was received at a subsequent time.

In one embodiment, each BLUETOOTH® component may maintain a list of bonded devices, connected devices or open sockets. When connectivity is re-established, the respective lists may be exchanged and each component may conform their list to the list received from the corresponding BLUETOOTH® component. Alternatively, one BLUETOOTH® component (e.g., the BLUETOOTH® component on the physical mobile device) may send the list to the BLUETOOTH® component at the virtual mobile device system, which may conform its list to the list received from the BLUETOOTH® component on the physical device. In one embodiment, the list of bonded devices may be reconciled, the list of connected devices may be reconciled and then the list of open sockets may be reconciled.

Following this reconciliation process, any remaining calls in the call buffer not associated with remaining open sockets may be dropped. Additionally, any actions on the pending action queue not associated with those open sockets may be dropped. Calls for the remaining set of calls in the buffer or calls for remaining actions on the action queue (e.g., associated with still open sockets) may then be generated and send to the corresponding BLUETOOTH® component.

Accordingly, embodiments as disclosed herein may allow BLUETOOTH® to be implemented in a seamless manner in a virtual mobile device system, as the BLUETOOTH® components on the physical device and virtual mobile device platform may hide or not expose the virtualization of the device over a network from both applications executing on a virtual mobile device platform and BLUETOOTH® enabled devices (interchangeably referred to herein as BLUETOOTH® peripheral device or BLUETOOTH® enabled peripheral devices without loss of generality).

Accordingly, embodiments as disclosed herein may allow Bluetooth to be implemented in a seamless manner in a virtual mobile device system, as the Bluetooth components on the physical device and virtual mobile device platform may hide or not expose the virtualization of the device over a network from both applications executing on a virtual mobile device platform and Bluetooth enabled devices (interchangeably referred to herein as Bluetooth peripheral device or Bluetooth enabled peripheral devices without loss of generality).

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As described above, a mobile device lives in a hostile world and, as such, securing the device itself may not be enough and/or possible. There is a desire to separate a physical device from applications that run on the device. Embodiments disclosed herein can remove the applications and services, even much of the device's operating environment from the hostile environment. Instead, these functions are provided on protected hardware and software in a data center where they can be managed, monitored, repaired, and deployed under the care of information technology (IT) experts and administrators.

Figure 1:
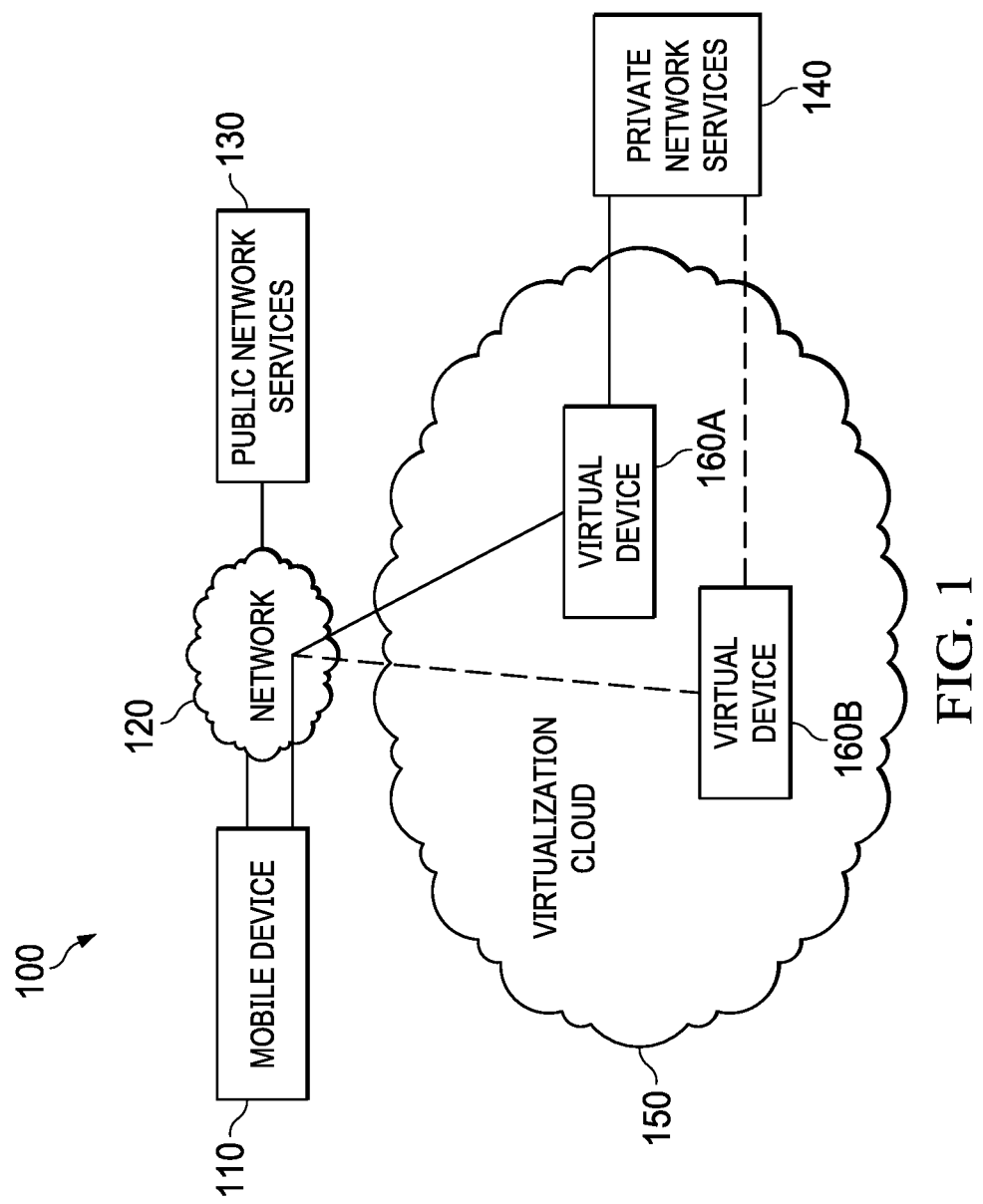
FIG. 1 depicts a diagrammatic representation of an example of an overall network environment in which embodiments disclosed herein may be implemented.

As illustrated in FIG. 1, embodiments disclosed herein can allow a user of mobile device 110 in network environment 100 to switch between using public network services 130 and using private network services 140. In particular, the user may access public network services 130 via public network 120 such as the Internet over which non-sensitive information may be communicated. However, to access private network services 140, a virtualization cloud client application (referred to hereinafter as a "VC client application") running on mobile device 110 connects to a virtualized device (e.g., virtual device 160A) hosted in virtualization cloud 150 and brokers access to private network services 140 as well as local device functions.

Those skilled in the art will appreciate that local device functions may vary depending upon the type of mobile device 110. For example, mobile device 110 can be a touchscreen smartphone with local device functions such as the touch screen, the dialer/phone network, camera, Global Positioning System (GPS), keyboard, speakers, microphone, and so on. Other examples of mobile device 110 may include touchscreen tablets and other touch-enabled mobile devices. As will be explained in further detail below, such mobile device functions can be provided by embodiments disclosed herein on protected hardware and software in virtualization cloud 150 without adversely affecting the user's experience in interacting with mobile device 110, even if the user travels frequently from one continent to another.

In some embodiments, multiple virtualized devices may be created for the same physical device. For example, in FIG. 1, virtual device 160A and virtual device 160B may be created for mobile device 110. This feature is further described below with reference to FIG. 2.

Figure 2:
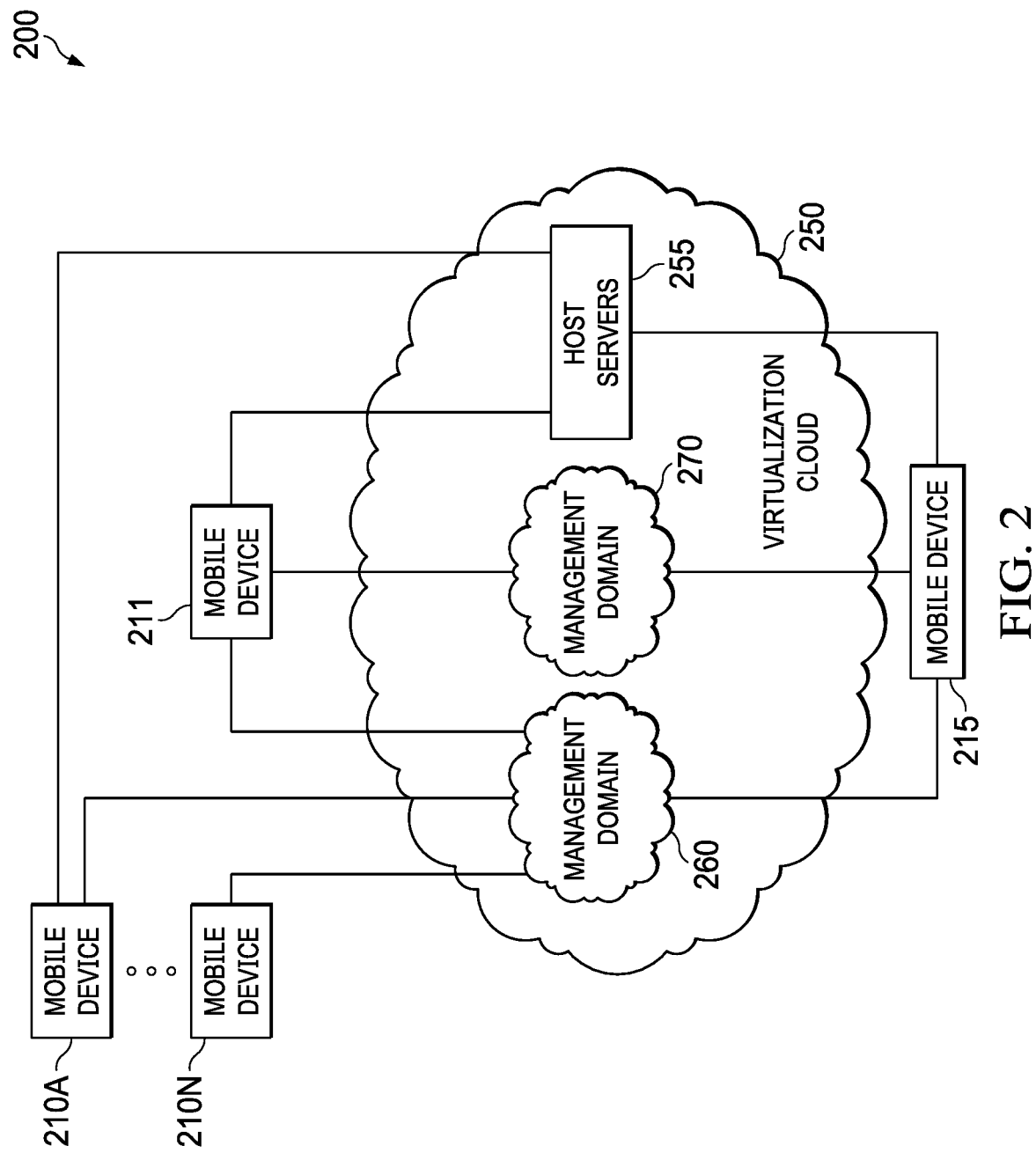
FIG. 2 depicts a diagrammatic representation of an example of a network architecture according to one embodiment.

FIG. 2 depicts a diagrammatic representation of an example of a network architecture according to one embodiment. In this example, system 200 may include virtualization cloud 250 communicatively connected to various types of mobile devices 210A . . . 210N, 211, and 215. Mobile devices 210A . . . 210N, 211, and 215 may represent different types of actual touchscreen devices such as smartphones and tablets. Mobile devices 210A . . . 210N, 211, and 215 may be owned by the same or different entities (e.g., enterprises, users, etc.). Further, mobile devices 210A . . . 210N, 211, and 215 may be programmed with different operating systems such as iOS, Android, and Windows.

Each of mobile devices 210A . . . 210N, 211, and 215 may have a VC client application installed, for instance, by an administrator or IT personnel of system 200. In one embodiment, a VC client application may be downloaded from an online device-specific app store.

In one embodiment, a VC client application may comprise software that brokers access to mobile devices' physical interfaces (e.g., soft and hard keyboards, touchscreen, GPS, camera, accelerometer, speakers, microphone, phone dialer, etc.) and Virtual Private Network (VPN) software that connects across a public network such as the Internet to servers in a virtualization cloud (e.g., virtualization cloud 150 of FIG. 1) over encrypted network interfaces. Virtualization cloud 250 may be an embodiment of virtualization cloud 150 described above with reference to FIG. 1.

Virtualization cloud 250 provides a hosted, networked, application environment. As a non-limiting example, in one embodiment, virtualization cloud 250 is configured as an Android application environment. As illustrated in FIG. 2, virtualization cloud 250 may comprise host servers 255 and management domains 260, 270.

Host servers 255 may host application services. Private network services 140 of FIG. 1 may be an embodiment of application services hosted by host servers 255 of FIG. 2. In one embodiment, a plurality of application services may execute on a collection of servers with extensions to support separation and segmentation of a core server.

Each management domain may comprise a collection of virtualized devices, hosted on one or more server machines. In an Android application environment, such virtualized devices may be referred to as virtual Android devices. From another perspective, a management domain is made up of a collection of server machines providing services to a large number of users. A collection of server machines may host virtual devices for these users and provide access to the applications and services via a remote client interface. In some embodiments, a management domain may further comprise a private application "store" for hosting installable approved enterprise applications particular to that management domain. In some embodiments, a user can have access to one or more "virtual devices" hosted in the management domain, each virtual device containing a core set of applications such as an enterprise address book, mail, calendar, web browser, etc. in addition to any preinstalled enterprise applications.

As FIG. 2 exemplifies, each mobile device (e.g., mobile device 210A, mobile device 211, mobile device 215, etc.) has a connection (via a VC client application installed thereon) to one or more server machines that host their virtual device(s) in a virtualization cloud (e.g., virtualization cloud 250). As explained below, the applications and their data located within a single virtual device are completely inaccessible to the applications and data in another virtual device. The applications are limited to the network services within their management domain and thus cannot access the network services provided in other management domains. For example, mobile device 210A may have a first virtual device hosted on a first server machine in management domain 260 and a second virtual device hosted on a second server machine in management domain 270. However, the applications and their data located within the first virtual device in management domain 260 are completely inaccessible to the applications and data within the second virtual device in management domain 270.

In some embodiments, for each connection to an application service hosted in the virtualization cloud, a different instance of the VC client application is started on the mobile device. For example, a first VC client instance may be started on mobile device 210A to access management domain 260 and a second VC client instance may be started on mobile device 210A to access management domain 270. All of the applications running in a particular management domain for a particular user will be accessed through the corresponding VC client application running on the mobile device. Additionally, the VC client application's remote connection software running in a mobile device does not expose application generated events running natively within the mobile device to the applications running in their virtual device(s), unless they are specific events from the devices brokered by the VC client application. In this way, rather than executing mobile applications in an actual device (e.g., mobile device 210A, etc.), the applications are run remotely in a virtualization cloud (e.g., virtualization cloud 250) under the watchful eyes of an enterprise's systems and network management tools and their administrators, separate from each other and from the consumer/Internet applications and data.

Figure 3:
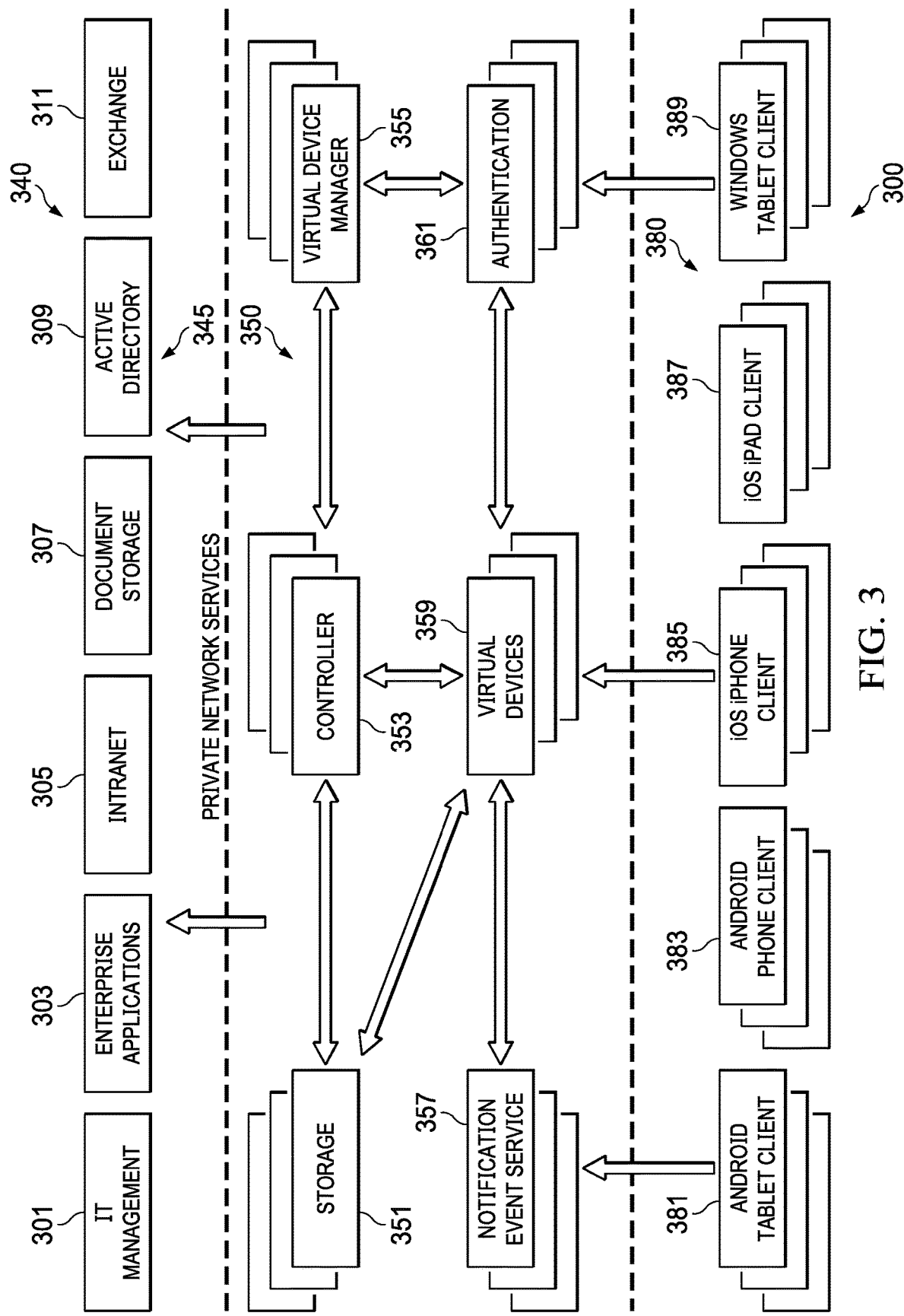
FIG. 3 depicts a diagrammatic representation of an example of a system architecture according to one embodiment.

Turning now to FIG. 3, which depicts a diagrammatic representation of an example of a system architecture according to one embodiment. In this example, system 300 comprises virtualization cloud 350 communicatively connected to private network services 340 and various types of mobile devices 380.

Mobile devices 380 may operate in a distributed computing environment and may operate on various types of operating systems. Similar to mobile devices 110, 210A . . . 210N, 211, 215 described above, each of mobile devices 380 may have a VC client application installed thereon. The installed VC client application may be device-specific. For example, each of Android tablets 381 may have an Android tablet client, each of Android phones 383 may have an Android phone client, each of iOS iPhones 385 may have an iOS iPhone client, each of iOS iPads 387 may have an iOS iPad client, and each of Windows tablets 389 may have a Windows tablet client.

Private network services 340 may comprise enterprise services for private network 345. Non-limiting examples of private network services 340 may include IT management 301, enterprise applications 303, intranet 305, document storage 307, active directory 309, and email exchange 311. These services are known to those skilled in the art and thus are not further described herein.

Virtualization cloud 350 may comprise a plurality of system components, including storage 351, controller 353, virtual device manager 355, notification event service 357, virtual devices 359, and authentication 361. These system components may run on a single server machine or separately on multiple server machines. For the sake of convenience, and not of limitation, FIG. 3 shows each system component running on multiple physical servers.

More specifically, virtual device manager 355 (an application that manages virtual devices) may send a command to controller 353 to create a virtual device. In one embodiment, controller 353 may implement the OpenStack open source cloud computing fabric controller. OpenStack is known to those skilled in the art and thus is not further described herein for the sake of brevity.

In response to the command from virtual device manager 355, controller 353 may first select a golden image, and any applications associated with the golden image. A golden image refers to a virtual machine that was built as a template and that usually contains little, if any, more than the base operating system. A golden image may also be referred to as a gold image, clone image, master image or base image. To create a golden image, an administrator first sets up the computing environment exactly the way it is needed and then saves the disk image as a pattern for making more copies. The use of golden images can save time and ensure consistency by eliminating the need for repetitive configuration changes and performance tweaks. This approach can be compared to automated replication, which requires a configuration management tool to build new images on demand. In a self-service provisioning environment, a collection of golden images may be referred to as a golden repository, gold catalog or golden image library.

Using the selected golden image, controller 353 may create virtual device instance 359 and associate with it a storage location in storage server 351. Storage server 351 holds the persisted, physical storage of each virtual device created by controller 353. Controller 353 may then return the information on virtual device instance 359 to virtual device manager 355.

In some embodiments, each user is assigned one or more virtual devices in one or more management domains when they are provisioned. These virtual "devices" contain applications, their settings and device configuration, as well as any data created locally in the device for the user by any installed applications. The images are maintained in network storage servers (e.g., storage servers 351) within the corresponding management domain(s). In some embodiments, as part of this image, the user is provided an emulated "flash" drive for app storage. The images can also be configured to permit access to external enterprise storage. In some embodiments, storage servers may utilize redundant storage to protect data from failures.

In some embodiments, authentication servers 361 may be configured to provide authentication and session management services. For example, when a user (via a VC client application running on a mobile device that the user is using) attempts to access an enterprise application, authentication server 361 may connect to one or more directory servers (e.g., active directory 309) to authenticate the user's access to virtual device(s) where the enterprise application can be run and to provision the user with one or more virtual devices. After the user authenticates, authentication server 361 may direct virtual device manager 355 to locate a device server that will host the user's virtual device 359. In some embodiments, it may ensure that virtual device 359 is "powered on" as well as initiate the initial session negotiation (via establishment of security tokens) between the mobile device running the VC client application and virtual device 359.

Those skilled in the art will appreciate that a virtual "device" is a not really a device—it is a remote execution environment for all of the services and applications that make up a device. There are (at least) two main classes of device servers, "bare metal" device servers and virtual machine device servers. There are some functional, deployment, and cost differences between these types and so ultimately implementation and market demand will determine their allocation and availability.

The bare metal device servers are made up of a large number of relatively small processing units similar in performance and scale to the processing units of actual mobile devices. Each virtual device instance can run on its own physical central processing unit ("CPU") hardware. In some embodiments, a modified version of the Simple Protocol for Independent Computing Environments (SPICE) protocol server software executes directly in the operating system (OS) on each of these instances to provide remote access.

SPICE is an open source protocol and implementation developed by Red Hat that provides remote access to virtual desktops. SPICE has a well-documented protocol that includes the ability to create new "channels" for different remote services. Embodiments extend the SPICE protocol to provide remote access to virtual devices and to broker access to the sensors of the real (physical) devices.

Virtual machine device servers are server class machines that can be found in the server market today. On the virtual machine device servers, each virtual "device" executes in its own virtual machine on a specially configured Linux device server. In some embodiments, a device server may be configured to provide Transport Layer Security (TLS) and VPN encryption, virtual device instrumentation/auditing, integrity checks and anti-virus from virtualization layer, system-side application management, learning of 'normal' behavior, protocol aware firewall, server-side TPM attestation, SELinux-based virtual device separation, VPN service for applications in the virtual devices, and network proxy for traffic monitoring. Some of these features are further explained below.

In some embodiments, virtual devices hosting Android (or Security Enhancements for Android (SEAndroid)) may be created for each user using Linux's Kernel-based Virtual Machine (KVM) and Quick EMUlator (QEMU).

KVM refers to a kernel-resident virtual machine infrastructure built directly into Linux as opposed to other virtualization techniques that run under Linux as a process. This architecture helps KVM operate very efficiently within Linux. KVM provides completely separate virtual environments for Android devices implementing embodiments disclosed herein. KVM itself does not provide any hardware emulation or remoting capabilities.

QEMU is a user-space emulator that works with KVM to provide the hardware emulation. While QEMU can provide processor instruction emulation, embodiments may employ it only for emulating hardware for the virtual device. For example, some embodiments use or provide emulated hardware for touch screen/display, memory/storage, audio, cameras, sensors, bypass, and networking.

Linux and KVM provide the isolation between each user and the applications that they run. It is not possible to communicate directly between the application components and services in these separate virtual containers. Thus, each "device", while sharing physical server hardware, runs independently and is separate from the others, as depicted in FIG. 4.

Figure 4:
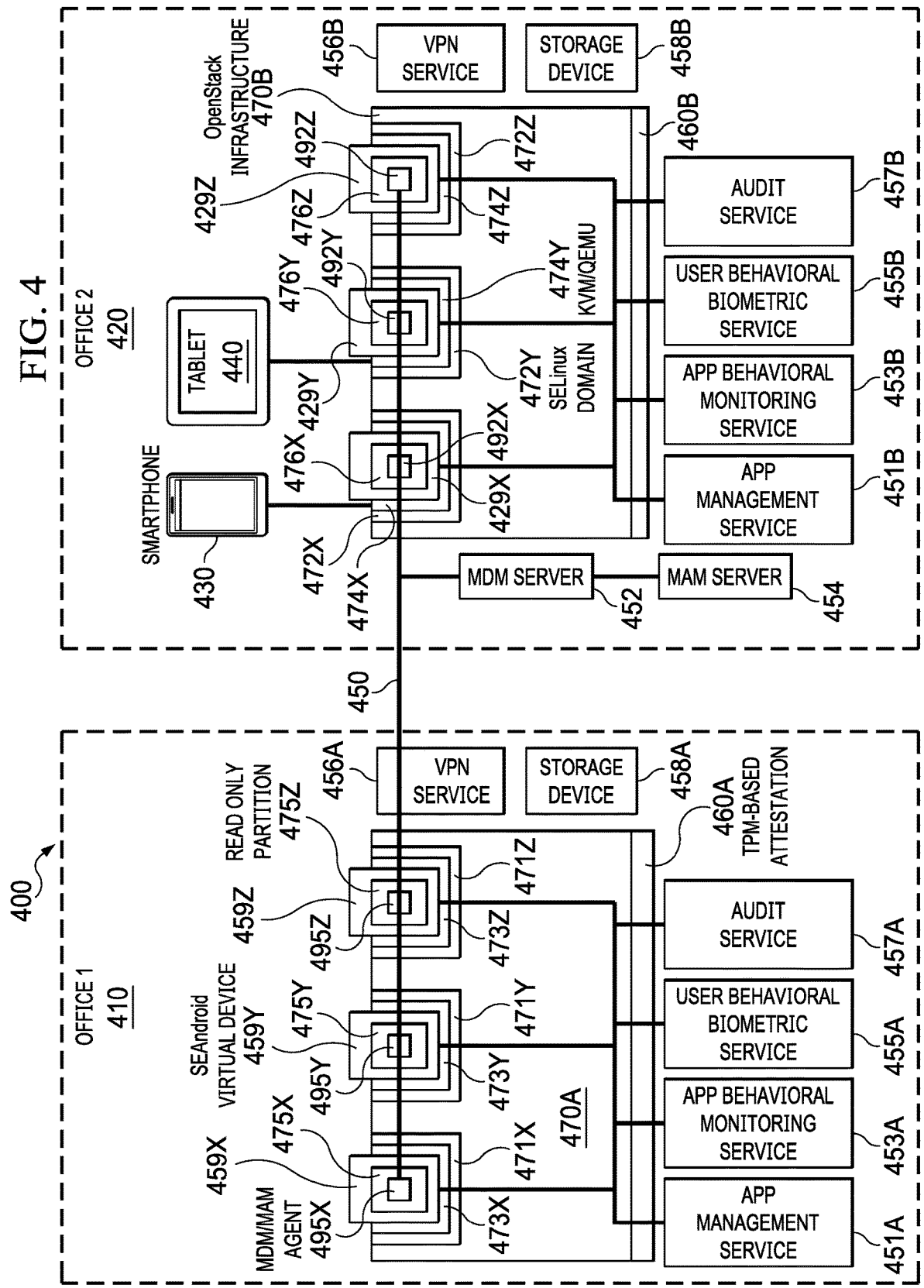
FIG. 4 depicts a diagrammatic representation of an example of virtual device containment and connections according to one embodiment.

FIG. 4 depicts a diagrammatic representation of an example of virtual device containment and connections according to one embodiment. In this example, virtualization cloud 400 may comprise management domain 410 (Office 1) and management domain 420 (Office 2).

Management domain 410 and management domain 420 may be hosted on device servers connected to management network 450 which provides a plurality of network services such as application management services 451A, 451B, application behavioral monitoring services 453A, 453B, user behavioral biometric services 455A, 455B, and audit services 457A, 457B.

Management domain 410 may comprise a plurality of virtual devices 459X, 459Y, 459Z implemented using OpenStack infrastructure 470A on Trusted Platform Module (TPM)-based attestation 460A. Each of the plurality of virtual devices 459X, 459Y, 459Z may include an agent of management network 450 (e.g., agents 495X, 495Y, 495Z, respectively). In some embodiments, the agent may be referred to as a mobile device management and mobile application management (MDM/MAM) agent. In this example, management domain 410 may further comprise VPN service 456A and storage service 458A.

Management domain 420 may comprise a plurality of virtual devices 429X, 429Y, 429Z implemented using OpenStack infrastructure 470B on TPM-based attestation 460B. Each of the plurality of virtual devices 429X, 429Y, 429Z may include an agent of management network 450 (e.g., agents 492X, 492Y, 492Z, respectively). In this example, management domain 420 may further comprise MDM server 452, MAM server 454, VPN service 456B, and storage service 458B.

As illustrated in FIG. 4, each of the plurality of virtual devices 459X, 459Y, 459Z in management domain 410 and each of the plurality of virtual devices 429X, 429Y, 429Z in management domain 420 has a read only partition and its own KVM/QEMU in a particular SELinux domain (e.g., read only partition 475X and KVM/QEMU 473X in SELinux domain 471X, read only partition 475Y and KVM/QEMU 473Y in SELinux domain 471Y, read only partition 475Z and KVM/QEMU 473Z in SELinux domain 471Z, read only partition 476X and KVM/QEMU 474X in SELinux domain 472X, read only partition 476Y and KVM/QEMU 474Y in SELinux domain 472Y, read only partition 476Z and KVM/QEMU 474Z in SELinux domain 472Z).

In the example of FIG. 4, the virtual devices are implemented as SEAndroid virtual devices. SEAndroid may provide benefits such as privileged daemon protection, application isolation, middleware controls, instrumentation and auditing, application install protection, limit application access to sensors, 'untrusted' application sandboxing, read-only core OS partition, centralized patching, and MDM/MAM controls.

In some embodiments, virtual devices can be migrated between device servers by administrative commands (via management network 450), using tools to automate the balancing of load across multiple device servers or based on geographical location.

Each of these virtual devices may be connected to a physical mobile device (e.g., smartphone 430, tablet 440, etc.). In some embodiments, a VC client application running on the physical device may be configured to provide remote two factor authentication, remote signing and decryption, TLS encryption for data in transit, GPS-based access policies, attributes exposed for MDM integration, mechanisms to improve attestation, and/or integration with the mobile device's Mobile Trusted Module (MTM).

When a user is added to a management domain, they are provisioned with a virtual device of a particular type. Similarly, when a user is removed, their virtual devices must be deactivated and their "parts" archived or reclaimed. A separate management server is used by administrators to manage the lifecycle of devices and users of a virtualization cloud (e.g., virtualization cloud 150, virtualization cloud 250, virtualization cloud 350, virtualization cloud 400, etc., collectively referred to hereinafter as the "VC system"). In some embodiments, provisioning services permit administrators to define device "types" (templates) and configurations and assign them to users depending upon the role or duty.

In some embodiment, the management of the VC system and the virtual devices can be controlled through a management policy system. Servers, storage, and virtual devices can be associated with hierarchically arranged policy containers. Policies and access to components can be controlled through these containers and their position in the hierarchy. In some embodiment, these policy containers may be referred to as policy domains and can be used to allocate and delegate control to multiple administration management domains.

For example, consider a hosted VC environment. A hosting partner wishes to support multiple enterprise customers in a single installation. At the same time, they would like to delegate much of the management to their customers. They may choose to create a single policy domain that contains shared resources such as common virtual device images, common device storage, and a shared pool of device servers. For each new customer, they create a sub-domain and grant administrative access to the customers' administrators for their respective sub-domain. In addition, they create a policy in the root domain that all resources are accessible to the sub-domains. The customers' administrators can now create assets (new device image templates, users, administrators, groups) within their own sub-domain. They, in turn, can create their own sub-domains and assign assets, users, groups, administrators, etc. to those sub-domains as well as policies to determine how resources can be inherited from the companies' sub-domain.

If one of these customers wants dedicated server resources to run the virtual devices or to maintain their storage, the hosting partner can add device server and storage server resources to their sub-domain(s) and thus only their virtual devices will be running or be saved on those server assets. Similarly, those systems might have different networking characteristics that would let them share a VPN connection to the enterprise as opposed to configuring a VPN within each of the virtual devices.

This organization can also be beneficial to enterprises that need to delegate management functions to different departments within their enterprise yet want to control and maintain the overall infrastructure centrally.

When migrating a user between two templates, the VC system can support intelligent upgrading, including:
  Scheduling specific times for upgrades to occur.
  Roll back to a previous device template if an error occurs.
  Partial, incremental upgrade processes across a user population.
  Detection of whether a user is active on a virtual device before enacting the upgrade.
  Graceful shut down of a virtual device for which an upgrade is being forced.

As a non-limiting example, in some embodiment, a provisioning and management server for the virtual machine device servers described above can be built on top of a virtual datacenter management platform such as OVirt, OpenStack, or the like. OVirt and OpenStack are known to those skilled in the art and thus are not further described herein. OVirt provides the underlying data services for managing and accessing virtual machines. The VC system provides an abstraction interface that hides much of the complexity of the underlying virtual datacenter management platform when trying to manage multiple management domains within a single system. In some embodiments, SPICE may be integrated into the virtual datacenter management platform, allowing users to connect to virtual machines through SPICE.

In some embodiments, an administrator might want to allow users to access a mobile virtual device without a persist state of the virtual device beyond a given user's session. In this case, the virtual device may be deleted when the session ends. In some embodiments, the virtual device may optionally warn the user that the virtual device is operating on a kiosk mode when the user logs in, and delete the virtual device when the user logs out. Essentially, the kiosk mode provides a 'fresh' virtual device based on a specified template each time a user logs in.

In a variant of the kiosk mode, a virtual device can be set to synchronize certain enterprise data (e.g., recent email) when the user logs into the kiosk mode device, but the virtual device is still deleted when the user logs out. In this way, any new enterprise data is placed back into the enterprise applications that should own each respective data type. This allows the user to move between server node clusters (e.g., moving between countries) without concern about moving or synchronizing virtual device state between the different servers.

The VC system may support additional modes of operation. For instance, a published app mode may enable an organization to offer specific applications in remote 'containers' to large user populations. An example would be a bank using the published app mode to make an online banking application available to its customers, while hosting that online banking application in their own data centers on their own locked down OS image.

In such a published app mode, the end client application icon can be customized to enable white labeling. For example, when the user logs in, the published application is already open and in focus. When the user quits the application, the remote connection closes. In some embodiments, the published app mode can be coupled with the kiosk mode described above such so that the virtual device does not have a persist state.

In some embodiments, an organization may wish to provision a virtual device (whether a full device, kiosk mode, published app, etc.) to a person not employed by that organization, and the user need only download a VC client application or add the account to their existing VC client application on their mobile device(s).

In some embodiments, an organization may wish to provision one or more virtual devices to one or more employees at a partner organization. In this case, the publishing organization can liaise with the consuming organization to add a VC client application and/or set of authentication settings to the consuming organization. One of the advantages of this approach is that the publishing organization can leverage the user provisioning and authentication mechanisms of the consuming organization. For example, access to the VC client application can become a setting in the consuming organization's active directory, and users in the consuming organization must already have authenticated to the consuming organization in order to have access to the publishing organization's applications/virtual devices.

In this scenario, doing two remoting steps would add latency and complexity to the VC system. To avoid this, when the user connects to the publishing organization's virtual device, the VC client application on the user's physical device can connect to the publishing organization's VC servers via a bypass channel in the VC server of the consuming organization.

As described above, SPICE can create new "channels" for different remote services. Different types of data can be communicated between a mobile device running a VC client application and a virtual device running in the VC system via different SPICE channels. These SPICE channels are mapped to virtual input/output channels.

Figure 5:
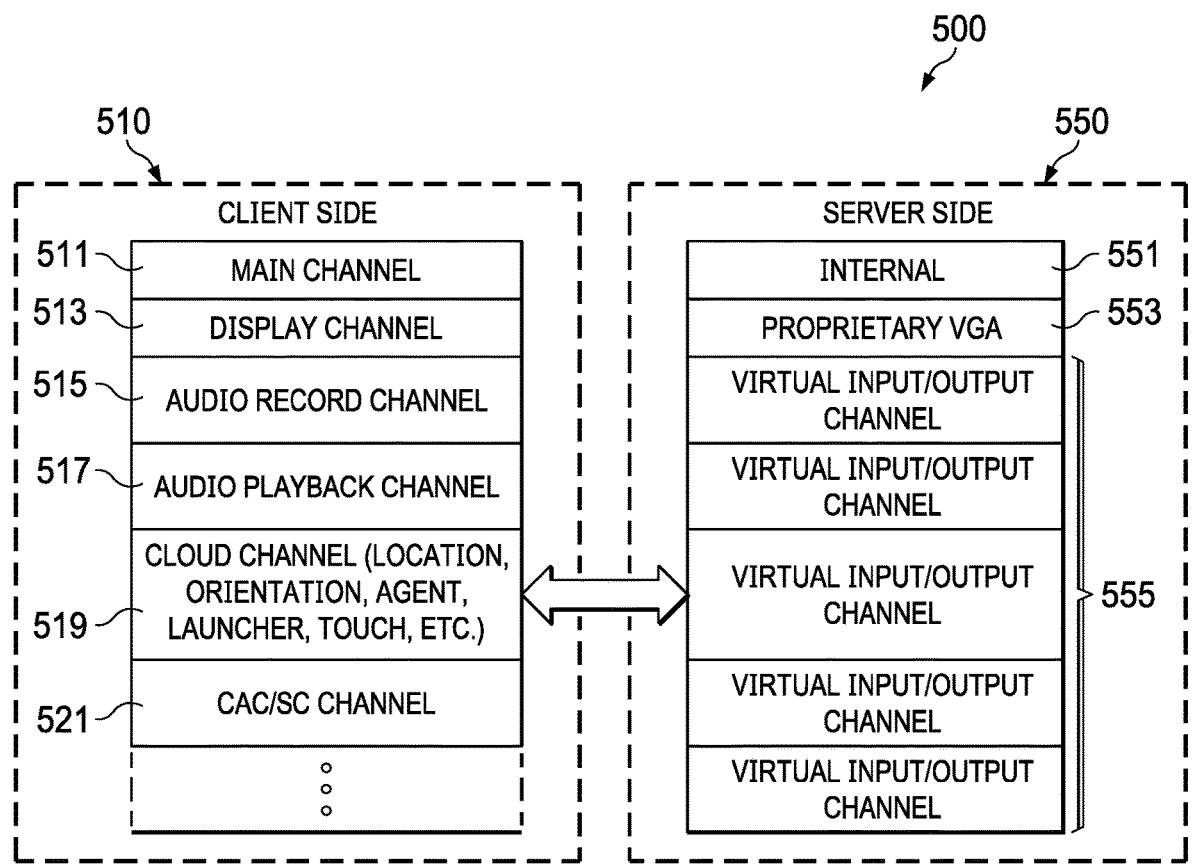
FIG. 5 depicts a diagrammatic representation of an example of a channel based device mapping architecture according to one embodiment.

FIG. 5 depicts a diagrammatic representation of an example of channel based device mapping architecture 500 according to one embodiment. In this example, data (e.g., display data, audio data, location data, etc.) may be communicated from a mobile device (e.g., client side 510) via various SPICE channels (e.g., main channel 511, display channel 513, audio record channel 515, audio playback channel 517, cloud channel 519, Call Admission Control (CAC)/Signaling Controller (SC) channel 521, a BLUETOOTH® channel, etc.) to a server in the VC system (e.g., server side 550). Channel based device mapping architecture 500 may include a virtual device mapping module embodied on a non-transitory computer readable medium and configured for mapping the incoming data to appropriate virtual device component (e.g., internal component 551, proprietary video graphic adapter (VGA) 553, etc.) and/or virtual input/output channels 555, each associated with a particular virtual driver. This is further described below with reference to FIG. 6.

Figure 6:
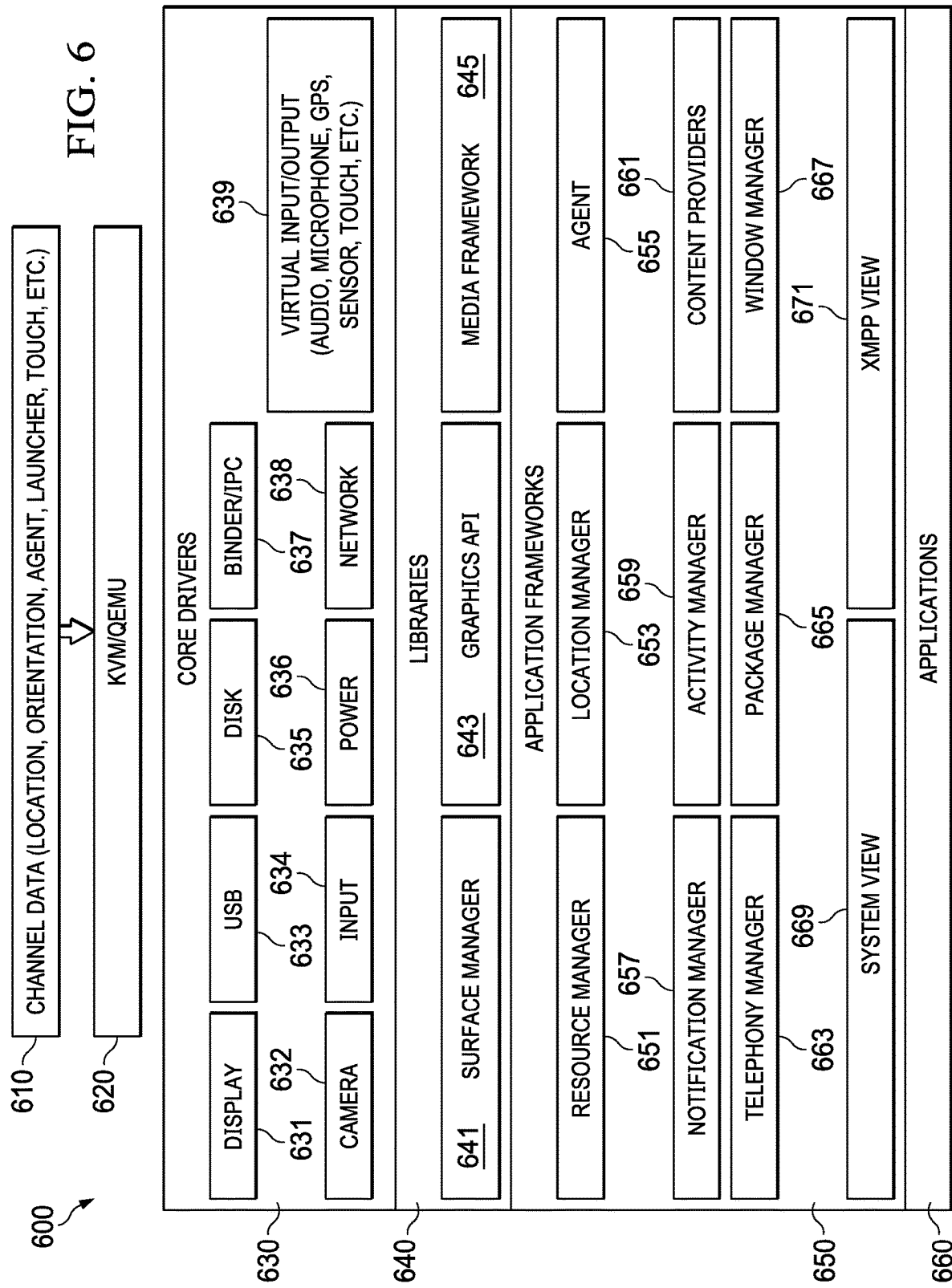
FIG. 6 depicts a diagrammatic representation of an example of virtualization server software architecture according to one embodiment.

FIG. 6 depicts a diagrammatic representation of an example of virtualization server software architecture according to one embodiment. As a non-limiting example, virtualization server software architecture 600 may implement a modified version of Android OS.

As illustrated in FIG. 6, virtualization server software architecture 600 may comprise a plurality of software components. At its core is a Linux kernel with specialized core drivers 630 to abstract the hardware layer from the application runtimes. Channel data 610 are received into a virtual device's KVM/QEMU 620, mapped via virtual input/output channels 639, and handled by corresponding virtual device drivers (e.g., display driver 631, universal serial bus (USB) driver 633, disk driver 635, binder/inter-process communication (IPC) driver 637, camera driver 632, input driver 634, power management 636, and network driver 638, etc.). These "virtual" device drivers replace the drivers for a real device and communicate using QEMU and the SPICE protocol with a VC client application executing on the mobile device for access to the real devices and the services they provide.

Virtualization server software architecture 600 may further comprise a collection of libraries for accessing data, working with text and graphics, encryption and communication, and the underlying OS. In the case of Android OS, each virtual device session includes a full complement of Android's application framework, libraries, runtime, and applications. However, some kernel-based services provided within a virtual device server are modified. For example, power management services are simulated and significantly altered as battery support is not an issue in a virtual device. User interface (UI) indicators for batteries and other elements not applicable to the virtual device can be made to reflect the values of the client device.

As another example, applications running in a virtual device do not use the local device's Wi-Fi or data network. Instead, they use the Internet Protocol (IP)-based network services provided by the virtual device servers. In some embodiments, an "always-on" network interface may be provided to the applications. Wi-Fi 33 and data connectivity management applications the user may install in the virtual device may have no relevance.

Virtualization server software architecture 600 may include additional virtual drivers not shown in FIG. 6. Many of the virtual drivers may communicate with a VC client application running on a mobile device using extensions to the SPICE protocol. Some are designed to improve performance whereas others provide access to features expected in a mobile device. Some example virtual drivers are further described below.

Virtual sensors driver—provides access to the remote client's sensor devices such as the GPS, the gyroscope, the accelerometer, a compass, battery level, Wi-Fi_33 signal strength, and 3G/4G signal strength. Other sensor types can be added as needed.

When an application requests access to a sensor such as the GPS, the sensors driver sends a device message that results in a sensor request being sent to the remote client. The remote client application then makes a similar request to the physical device and begins forwarding sensor data back to the sensor driver as the sensor produces data. When the application no longer needs the sensor information, a close request is sent back to the client where it then stops monitoring the specified sensor.

Some sensors, such as the GPS, can draw significant battery power while running. To prevent unnecessary battery drain, the VC client application running on the physical mobile device can request that the GPS on the local mobile device be turned on or off based on the requirements of applications running on the virtual device in the VC system.

Some sensors such as the accelerometer may change values very frequently. The VC client application can be configured to sample and relay accelerometer values from the local physical device based on attributes and requirements of the app running on the virtual device in the VC system as well as the performance of the network connection between the local and virtual devices (higher network latency and lower available bandwidth result in fewer sensor values being communicated).

A specific example of this is in how the VC system synchronizes the orientation of the remote virtual device to the orientation of the local device by continually monitoring and relaying orientation change events on the accelerometer on the local device, while not relaying every minor rotation of the device all the time even if the application on the remote virtual device is not monitoring the accelerometer data.

Additional sensors that the VC system can remote from the local device to the virtual device may include the network type, network signal strength, battery charge remaining, light sensor (used for screen dimming), BLUETOOTH®, peripheral device connectivity and the state of any local payment credential.

Virtual touchscreen driver—supports remoting of multi-touch actions and also gestures. Multi-touch gestures can be used for zooming, rotating and other similar operations. In one embodiment, the SPICE mouse channel may be modified for this purpose. In some embodiments, a designated channel is used for this purpose.

Audio and video bypass driver—improves the performance of audio and video processing for both the VC server and the VC client. While embodiments can work without bypass, there is a CPU cost on both the client and the server when using the internal video processing of the host operating system (e.g., Android). To this end, modified media framework 645 is provided to replace audio and video players that came with the OS with special players that implement the bypass functions. For example, when an application requests to play a video using the Android video player (either full-screen or embedded), the bypass video player captures either the video data or an Universal Resource Locator (URL) that points to an address where the actual video file resides, and passes it via the bypass driver to the remote client. The client then spawns a local video player and plays the video stream. In the case of network video sources, the entire stream can be handled outside of the virtual device via a network proxy.

Audio bypass works much like video bypass. The audio player is replaced to provide proxy access to audio data in the client.

Virtual camera driver—remotes a camera using a combination of a virtual camera device driver and modifications to the camera functions in the media framework. When the camera activity or fragment is loaded in the virtual device, the modified camera viewer and virtual camera driver sends a request to the client to bring up the camera. Once a picture is taken, the picture or video is sent to the virtual device server where it can be placed in the flash storage of the virtual device or can be delivered to an anti-virus scanner and then placed in enterprise storage.

Virtual display driver—optimizes delivery of graphics to a remote client. More specifically, the graphics layer can be instrumented to generate messages via a virtual display driver instead of writing directly to a frame buffer. In some embodiments, surface manager 641 in libraries 640 is implemented to handle partial updates to the Android display. In some embodiments, surface manager 641 may work in conjunction with graphics API 643 to provide acceleration for various commands issued by applications and the Android OS.

These and other virtual drivers support remote access for applications 660 running on application frameworks 650 in the virtual device. Operation of the virtual device, including processes associated with applications 660, as well as user behaviors can be monitored via various components in application frameworks 650 (e.g., resource manager 651, location manger 653, agent 655, notification manager 657, activity manager 659, content providers 661, telephony manager 663, package manager 665, window manager 667, system view 669, Extensible Messaging and Presence Protocol (XMPP) communications service 671, etc.), some of which will be further described below.

As described above, a physical mobile device is separated from applications, which are run on protected hardware and software in a data center where they can be managed, monitored, repaired, and deployed under the care of information technology (IT) experts and administrators. To better understand the techniques described it is useful here to illustrate an embodiment of the implementation of a virtual mobile device in association with a client mobile device (e.g., a physical mobile device) utilized in association with a BLUETOOTH® enabled device.

Figure 7:
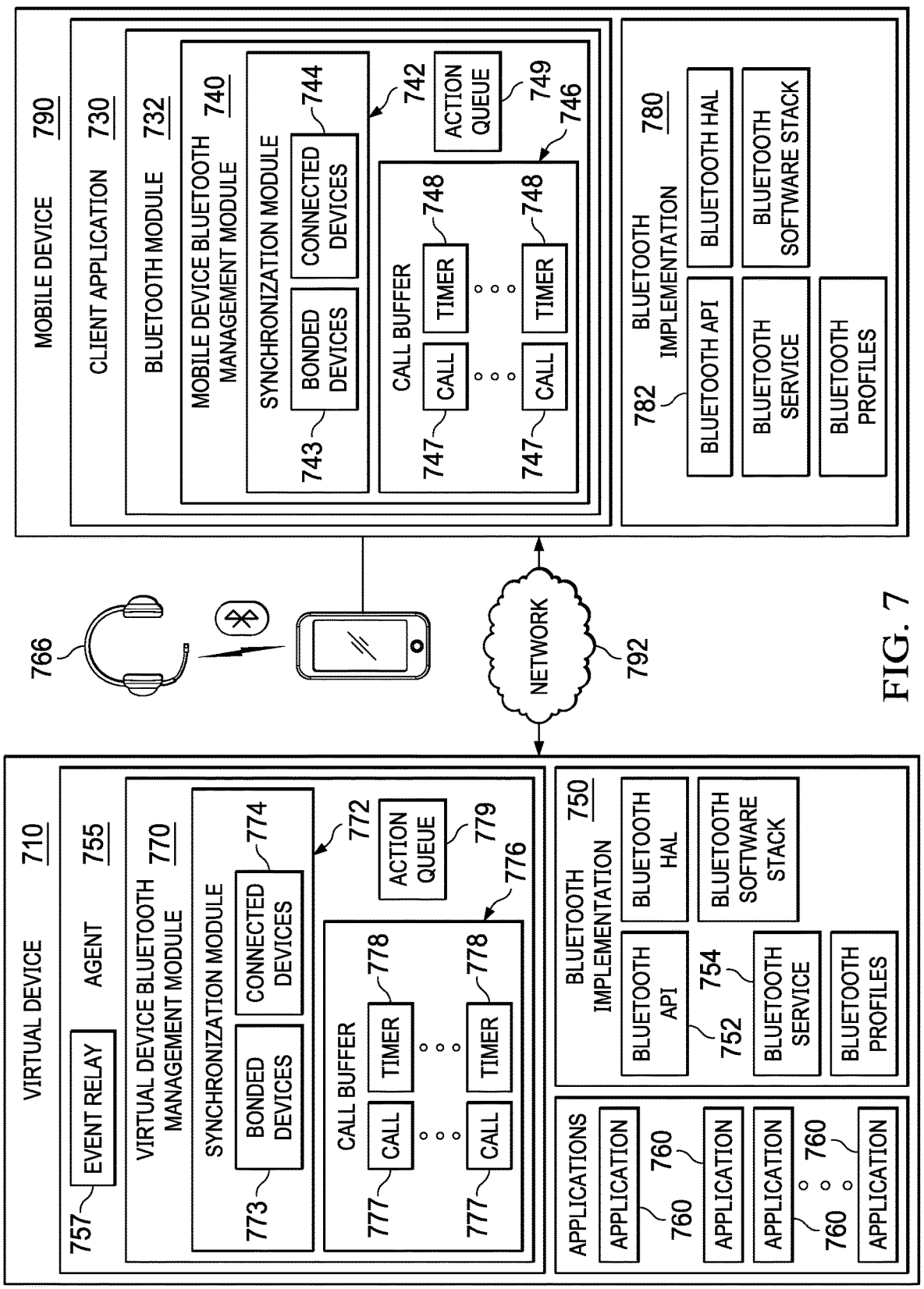
FIG. 7 depicts a diagrammatic representation of one embodiment of a BLUETOOTH® architecture for use in a virtual mobile device platform.

Turning now to FIG. 7, a mobile device 790 has a VC client application 730 (also referred to just as the client application) installed thereon as discussed. While the VC client application 730 may be specific to the device 790 or operating system of the device 790, for the purposes of this description, an exemplary Android environment will be used. Other examples and environments are also possible and may be utilized with embodiments as described herein such as, for example, Windows or iOS, as one skilled in the art will understand.

As mentioned above, the physical mobile device 790 is separated from applications 760, which are run on a virtual device 710 using protected hardware and software where they can be managed, monitored, repaired, and deployed under the care of information technology (IT) experts and administrators. In some embodiments, the VC client application 730 collects events from the physical mobile device 790 and transmits information relating to the events to the virtual device 710 over network 792. The events can be processed by an agent 755 on the virtual device 710 and provided to a corresponding application 760 executing on the virtual device 710 by event relay 757. In turn, the application 760, or libraries or drivers on the virtual device 710, provide events to the agent 755 which forms corresponding events and sends them to the client application 730 on the mobile device 790 over network 792. The VC client application 730 then takes action based on the received events, including for example providing output through the mobile device 790, such as through the rendering of graphical displays using the graphics stack of the operating system of the mobile device 790.

The applications 760 executing on the virtual device 710 may be unaware of their execution environment (for example, they may not be modified from their implementation in a non-virtualized architecture). From their perspective, the virtual device 710 mirrors the corresponding physical mobile device 790. Therefore, these applications 760 may wish to use aspects or features of a physical mobile device 790 or the operating system executing thereon, despite that the applications 760 are actually executing on a virtual device 710 (e.g., or on the operating system used for such a virtual device 710).

In particular, one or more of these applications 760 may be BLUETOOTH® enabled, meaning that the application may wish to discover BLUETOOTH® enabled devices 766, connect with discovered BLUETOOTH® enabled device 766 or exchange data with a bonded or paired BLUETOOTH® enabled device 766. To accomplish this BLUETOOTH® bonding, pairing or data exchange, the application 760 may issue a set of calls to discover BLUETOOTH® enabled devices 766, to pair with a BLUETOOTH® enabled device 766, to connect with a BLUETOOTH® enabled device 760 or to read or write data to a data stream for a connected BLUETOOTH® enabled device 760.

Specifically, BLUETOOTH® implementation 750 may include portions in the application framework, libraries or core drivers on the virtual device 710 as discussed above with respect to FIG. 6. For example, the BLUETOOTH® service 754 of the BLUETOOTH® implementation 750 may be accessed through BLUETOOTH® APIs 752 that are substantially equivalent to standard BLUETOOTH® APIs on the operating system (e.g., the Android Bluetooth API android.bluetooth.*). The BLUETOOTH® service 754 implemented on the virtual device 710 may operate in association with agent 755 to manage BLUETOOTH® connections between application 760 and BLUETOOTH® enabled device 766. For example, the BLUETOOTH® service 754 or other modules of the BLUETOOTH® implementation 750 may operate to process calls issued by the application 760 associated with a BLUETOOTH® connection such that appropriate events may be issued to client application 730 on the mobile device 790 for that connection. The BLUETOOTH® service 754 may also process events generated by the client application 730 associated with a BLUETOOTH® connection such that appropriate data may be returned to the appropriate application 760 associated with that BLUETOOTH® connection on the virtual device 710.

Accordingly, BLUETOOTH® calls issued by an application 760 on the virtual device 710 are passed through the agent 755 to the client application 730 on the mobile device 790 (e.g., using events issued by the agent 755 to the client application 730). The client application 730 can then utilize the BLUETOOTH® module 732 to pass the call on to the BLUETOOTH® implementation 780 on the physical mobile device 790 (e.g., through the BLUETOOTH® API 782 on the mobile device 790). A BLUETOOTH® connection can then be established between the client application 730 on the mobile device 790 and the BLUETOOTH® enabled device 766. Thus, data transmitted over that BLUETOOTH® connection between the BLUETOOTH® enabled device 766 and the client application 730 (e.g., using the radio at the physical mobile device 790) according to the BLUETOOTH® protocol implemented.

Accordingly, BLUETOOTH® calls issued by application 760 executing on the virtual device 710 may be received by agent 755, and one or more equivalent events for the call may be sent by agent 755 to client application 730 at the physical mobile device 790 over communication network 792. The client application 730 can receive these events and provide them to BLUETOOTH® module 732 on the mobile device 790. The BLUETOOTH® module 732 may then issue corresponding calls to the BLUETOOTH® implementation 780 on the mobile device 790 such that the BLUETOOTH® calls issued by applications 760 on the virtual device 710 can be implemented with respect to the BLUETOOTH® implementation 780 and BLUETOOTH® device 766 at the physical mobile device 790.

Similarly, BLUETOOTH® calls issued by the BLUETOOTH® enabled device 766 may be received at the BLUETOOTH® implementation 780 at the physical mobile device 790 and the BLUETOOTH® module 732 of the client application 730. The BLUETOOTH® module 732 may generate events corresponding to these received calls and client application 730 and may send them to the agent 755 on the virtual device 710 over the communications network 792. The agent 755 may then utilize BLUETOOTH® implementation 750 on the virtual device 710 such that the BLUETOOTH® calls issued by the BLUETOOTH® enabled device 766 (or data thereof) may be provided to the appropriate application 760 executing on the virtual device 710. In this manner, an application 760 executing on the virtual mobile device 710 may communicate with, and utilize, a BLUETOOTH® enabled device 766 in association with the physical mobile device 790 using the radio at the physical mobile device 790.

As may be realized, the disruption of the communications (e.g., of events) between the virtual device 710 and the physical device 790 over the communication network 792 may prove problematic. As noted, applications 760 executing on a virtual device 710 and BLUETOOTH® enabled device 766 may be similar to standard applications and peripheral devices (e.g., they may not be modified from their implementation in a non-virtualized architecture). Accordingly, applications 760 and BLUETOOTH® enabled device 766 may be configured to respond to BLUETOOTH® calls within a certain time frame, or may be configured to behave as if previously issued calls were actually performed or received by the BLUETOOTH® implementation to which they were issued. The disruption of communications over network 792 prevents events from the agent 755 and client application 730 associated with such calls from being communicated between them. In the absence of any other action, the inability to communicate such events and implement the various calls issued by the applications 760 or BLUETOOTH® device 766 would severely hamper the implementation and use of BLUETOOTH® in a virtual mobile device platform resulting in the constant disconnection between applications 760 and BLUETOOTH® devices 766 or the closing or dropping of connections or sockets between applications 760 and BLUETOOTH® devices 766.

It is thus desired that the components of the virtual device 710 and the client application 730 have some manner of gracefully dealing with the inability to deliver such BLUETOOTH® events between the physical mobile device 790 and the virtual device 710. In particular, it is desired that such connectivity issues are dealt with in a manner that is as transparent as possible to the various other components of the physical mobile device 790 and virtual device 710, including the applications 760 and the BLUETOOTH® enabled device 766.

Accordingly, in one embodiment, agent 755 includes virtual device BLUETOOTH® management module 770 and BLUETOOTH® module 732 of client application 730 includes mobile device BLUETOOTH® management module 740. Each of the BLUETOOTH® management modules 740, 770 facilitates the processing of BLUETOOTH® calls by processing received BLUETOOTH® calls in a first manner in a connected state and processing BLUETOOTH® calls in a disconnected state in a second manner. In particular, in a connected state, one or more events for a received BLUETOOTH® call may be generated and sent over communication network 792. In a disconnected state, the BLUETOOTH® call may be processed based on whether the disconnected state is a temporarily disconnected state or a permanently disconnected state.

Figure 8:
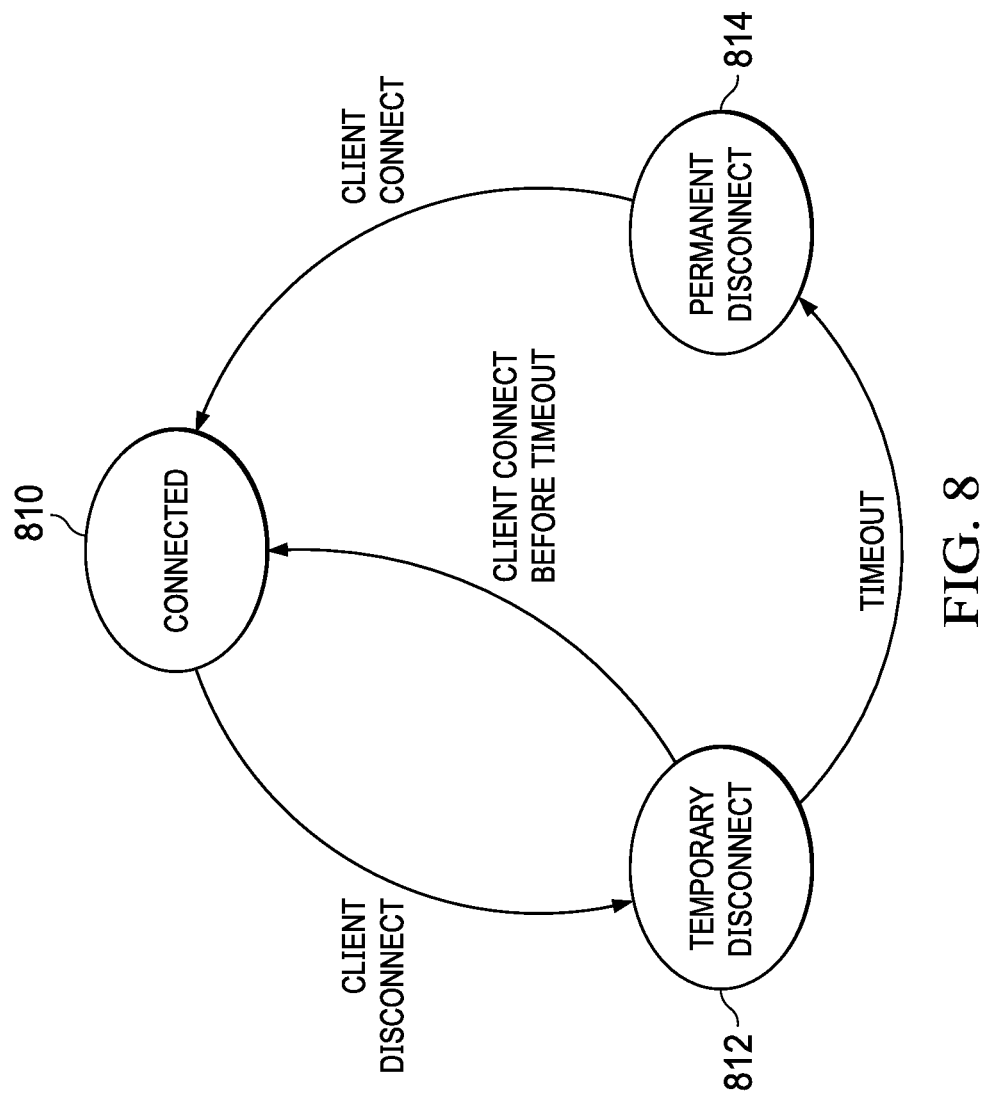
FIG. 8 depicts a diagrammatic representation of one embodiment of a state diagram that may be associated with a call.

FIG. 8 depicts one embodiment of a state diagram for a call in certain embodiments of a virtual mobile device platform. It will be noted that according to certain embodiments, the states 810, 812 and 814 may be maintained or otherwise associated with each individual call. According to one embodiment then, connected state 810 may be a state where BLUETOOTH® modules 740, 770, or agent 755 and client application 730, or other components may be able to communicate. If a disconnect occurs (e.g., there is a loss of communication for a certain time period or threshold, or a communication is not responded to, temporary disconnect state 812 may be entered. An associated timer designating a temporary disconnection period be associated with the call when it enters a temporary disconnect state 812. The duration of the timer may, for example, be dependent on the type of call, or may be the same for each type of call. In one embodiment for example, the temporary disconnection period for the timer may be based on an amount of time it would take to implement the call if the call were being issued by an application executing on a physical mobile device in a non-virtualized context. If connectivity is reestablished before the expiration of the time out period the connected state 810 may be reentered at that point. If connectivity on the communication network is reestablished before the expiration of the timer associated with the call and the connected state 810 reentered, an associated call (e.g., one or more events associated with the call) may be sent to the corresponding BLUETOOTH® component (e.g., the BLUETOOTH® component associated with a destination for the call) across the communication network.

If connectivity is not established within the temporary disconnection period (e.g., before the expiration of the timer, referred to as a timeout) for the call, the connection is considered permanently disconnected with respect to that call and a permanently disconnected state 814 is entered Here, an action may be taken for the call in a permanently disconnected state.

When connectivity is once again reestablished and connected state 810 entered, any corresponding actions associated with the call that resulted from entering a permanently disconnected state 814 may be performed. Additionally, when a connected state 810 is reestablished after a permanently disconnected state 814, the BLUETOOTH® components on the physical mobile device and the virtual mobile device platform may be synchronized such that the BLUETOOTH® components include the same state with respect to the BLUETOOTH® connections or sockets currently open.

Returning to FIG. 7, in particular, in one embodiment a connectivity state may be maintained or determined by the BLUETOOTH® modules 740, 770 or agent 755 and client application 730 based upon, for example a heartbeat between the BLUETOOTH® management modules 740, 770 or agent 755 and client application 730 over the communication network 792, or a threshold number of network errors or dropped packets on the communication network 792. Moreover, each BLUETOOTH® modules 740, 770 may maintain a list 743, 773 of bonded devices and a list 744, 774 of connected devices or open sockets. As discussed, if the connectivity state indicates a connected state when a BLUETOOTH® call is received (e.g., from an application 760 through BLUETOOTH® service 754 or through BLUETOOTH® module 732 from BLUETOOTH® API 782) one or more events for the received call may be generated (e.g., by the BLUETOOTH® module 732 or the agent 755) and sent across communication network 792 (e.g., to the agent 755 or the client application 730).

If, however, the connectivity state indicates a disconnected state when a BLUETOOTH® call is received (e.g., from an application 760 through BLUETOOTH® service 754 or through BLUETOOTH® module 732 from BLUETOOTH® API 782), the call 747, 777 may be stored in a memory location (referred to as call buffer 774, 776) and associated with a timer 748, 778. This timer 748, 778 may designate a temporary disconnection period associated with that call 747, 777 such that a flag, interrupt or other event may be raised to the management module 740, 770 when the timer 748, 778 has expired. The duration of the timer may, for example, be dependent on the type of call, or may be the same for each type of call. In one embodiment, the temporary disconnection period may be based on an amount of time it would take to implement the call if the call were being issued by an application executing on a physical mobile device in a non-virtualized context. Accordingly, each BLUETOOTH® management module 740, 770 may be configured with, or may store, a set of calls and associated temporary disconnection periods such that the appropriate temporary disconnection period may be determined for a received call and set in the associated timer 748, 778 for a call 747, 777 placed in the call buffer 746, 776.

At the expiration of the timer 748, 778 associated with a call 747, 777 the connection over network 792 is considered permanently disconnected with respect to that call 747, 777. Here, BLUETOOTH® management modules 740, 770 may take an action for the call 747, 777 when it is considered to be in a permanently disconnected state (e.g., even though the call 747, 777 has not actually been completed or carried out). This action may be to return a response to the call 747, 777 to the application 760 or BLUETOOTH® peripheral device 766 which originally issued the call 747, 777. In one embodiment, an error may be returned in response to a call 747, 777 in a permanently disconnected state (e.g., if an error is defined as a possible return of the call 747, 777); a success or completion may be returned in response to a call 747, 777 in a permanently disconnected state; or a status may be returned in response a call 747, 777 in a permanently disconnected state.

Specifically, each BLUETOOTH® management module 740, 770 may be configured with, or may store, a set of calls and associated returns for permanently disconnected states for those calls such that this mapping may be accessed when a call 747, 777 is determined be in a permanently disconnected state and the appropriate return for the permanently disconnected call 747, 777 determined and returned to the application 760 or BLUETOOTH® peripheral device 766 which originally issued the call 747, 777. The configuration for the calls and these or returns may, for example, be based on the operating system implemented on the virtual device 710.

One example of a call where an action might be to return an error in response to the call once the call is determined to be in a permanently disconnected state is an createInsecureRfcommSocketToServiceRecord or createRfcommSocketToServiceRecord call. If such a call is stored in the call buffer 746, 776 and enters a permanently disconnected state an error (e.g., an IOException) may be returned to the application 760 that issued the call. Similarly, one example, of a call where an action might be to return success in response to the call once the call is determined to be in a permanently disconnected state is a close call for a socket. If such a call is stored in the call buffer 746, 776 and enters a permanently disconnected state a success statues may be returned to the application 760 that issued the call.

One example, of a call where an occurrence or a status might be returned in response to the call once the call is determined to be in a permanently disconnected state is a startDiscovery or startScan call. If such a call is stored in the call buffer 746, 776 and enters a permanently disconnected state a status of no devices found may be returned (e.g., in a ScanCallback object) to the application 760 that issued the call. Other examples of such calls and their corresponding actions, including examples of connected behavior and associated disconnected behaviors may be that when connected scan requests (e.g., from an application) are forwarded on to the physical device and when disconnected a scan request waits an appropriate timeout (e.g., 6 seconds) and returns scan finished without returning any found devices. As another example, when in a connected state, BLUETOOTH® device connects or write commands are forwarded on to the physical device and when disconnected, BLUETOOTH® device connects, writes to BLUETOOTH® socket, or similar commands, will buffer for a short timeout (e.g., 500 ms) to give the connection time to reconnect and then return a failure code or raise an exception. The return may also optionally initiate a low level disconnect notification for the device (e.g., on Android an ACTION_ACL_DISCONNECTED intent).

As yet another example, when in a connected state, sockets may stay open. When disconnected the open sockets may be maintained. Upon reconnection the bonded devices list may be synchronized and, other actions performed such as closing any stateful communication paths like sockets. As an action or set of actions that may be performed upon disconnection, after a suitable timeout (e.g., 30 seconds) any connected devices may be notified of a low level disconnection (e.g., ACTION_ACL_DISCONNECTED). Open sockets and other stateful communication paths may be closed as appropriate. It will be noted that these examples are non-limiting; other embodiments and calls will be apparent to those of ordinary skill after reading the disclosure herein and all such embodiments and calls are fully contemplated herein. In particular, it should be noted with respect to the examples and embodiments presented herein, that while these examples and embodiments may be explained and depicted utilizing the sockets of BLUETOOTH® Classic, other embodiments may also be applied to other versions of BLUETOOTH® such as, but not limited to, BLUETOOTH® Low Energy (LE) (BLUETOOTH® Smart), BLUETOOTH® High Speed, or other BLUETOOTH® implementations, as would be understood by one of ordinary skill in the art. All such embodiments are fully contemplated herein.

Once an action is taken for the call 747, 777 when it is considered to be in a permanently disconnected state, the call 747,777 may be removed from the call buffer 746, 776 along with the associated timer 748, 778. It will be noted here that despite that a return or other action was taken for the call when the call 747, 777 entered a permanently disconnected state, the call 747, 777 was never actually sent to, received by, or executed on, the intended destination (e.g., application 760 or BLUETOOTH® peripheral device 766). As such, in some embodiments, there may be one or more actions with respect to a permanently disconnected call 747, 777 that it is desirable to perform subsequently whenever connectivity is reestablished over the communication network 792 (referred to as a reconnect action).

Accordingly, when an action is taken for the call 747, 777 when it is considered to be in a permanently disconnected state, one or more corresponding reconnect actions may be entered into action queue 749, 779. The entered reconnect action may, for example, specify one or more calls and a corresponding bonded device, connected device, input or output stream, socket, etc. The corresponding reconnect action entered into the action queue 749, 779 for the call 747, 777 may be equivalent to the call 747, 777 (e.g., a close call may entered into the action queue 749, 779 when a close call 747, 777 is determined to be in permanently disconnected state and an action taken for that call 747, 777). Alternatively, the corresponding reconnect action entered into the action queue 749, 779 may be an alternative or additional action to that of the call 747, 777 considered to be in a permanently disconnected state (e.g., and removed from call buffer 746, 776).

Again, each BLUETOOTH® management module 740, 770 may be configured with, or may store, a set of calls and associated subsequent reconnect actions for those calls such that this mapping may be accessed when a call 747, 777 is determined be in a permanently disconnected state, and the appropriate reconnect actions for the permanently disconnected call 747, 777 determined and entered into the action queue 749, 779. It will also be noted that the reconnect actions entered into the action queue 749, 779 when a call 747, 777 is considered to be in a permanently disconnected state may be based on the action taken (e.g., the return) to the original call 747, 777 when it was determined that call 747, 777 was in a permanently disconnected state.

During a disconnected state then, any received calls 747, 777 may be entered into the call buffer 746, 776 with an associated timer 748, 778. When a call 747, 777 in the call buffer 746, 776 enters into a permanently disconnected state based on the expiration of the associated timer 748, 778 an action may be taken to return a response to the original call 747, 777 such as an error, a success or completion or a status. Additionally, one or more corresponding reconnect actions for the permanently disconnected call 747, 777 may be entered into action queue 749, 779. The call 747, 777 can then be removed from the call buffer 746, 776.

When the connectivity state transitions from the disconnected state to a connected state (e.g., as determined by a heartbeat message between the agent 755 and the client application, a number of network errors, etc.), BLUETOOTH® management modules 740, 770 may be configured to synchronize. As mentioned above, each BLUETOOTH® modules 740, 770 may maintain a list 743, 773 of bonded devices and a list 744, 774 of connected devices or open sockets. In a disconnected state these lists 743, 773, 744, 774 may be become out of synchronicity. For example, a BLUETOOTH® device 766 may disconnect from the mobile device 790 causing a list 743, 744 on the mobile device 790 to change. Since there is no connectivity over network 792, the corresponding lists 773, 774 may not be similarly updated.

Thus, when the connectivity state transitions from the disconnected state to a connected state, synchronization modules 742, 772 of the BLUETOOTH® management modules 740, 770 may exchange these lists 743, 744, 773, 774 such that these lists may be synchronized with one another. Alternatively, only one synchronization module synchronization modules 742, 772 may send its lists 743, 744, 773, 774 to the other synchronization module 742, 772, which may then be used to update or replace the lists 743, 744, 773, 774 on the receiving synchronization module 742, 772. Following this synchronization, it can be determined for each of the calls 747, 777 still in the call buffer 746, 776 whether it is associated with a bonded device, connected device or open socket listed in lists 743, 744, 773, 774. All calls 747, 777 not associated with a bonded device, connected device or open socket listed in lists 743, 744, 773, 774 may be dropped or otherwise discarded. If, however, the call 747, 777 is associated with a bonded device, connected device or open socket listed in lists 743, 744, 773, 774, one or more events for the call 774, 777 may be generated and sent by the agent 755 (or BLUETOOTH® module 732) to client application 730 (or agent 755) over communication network 792.

Similarly, it can be determined for each of the (reconnect) actions in the action queue 749, 779 whether it is associated with a bonded device, connected device or open socket listed in lists 743, 744, 773, 774. All reconnect actions in the action queue 749, 779 not associated with a bonded device, connected device or open socket listed in lists 743, 744, 773, 774 may be dropped or otherwise discarded. If, however, a reconnect action in the action queue 749, 779 is associated with a bonded device, connected device or open socket listed in lists 743, 744, 773, 774, one or more events for the reconnect action may be generated and sent by the agent 755 (or BLUETOOTH® module 732) to client application 730 (or agent 755) over communication network 792.

It will be noted here that this is but one embodiment of synchronization between the BLUETOOTH® management modules 740, 770 and that other embodiments of such synchronization are possible. For example, lists 743, 744, 773, 774 may not be synchronized, and events for all calls 747, 777 in the call buffer 746, 776 may be generated and sent based on a determination if the call 747, 777 is associated with a bonded device, connected device or open socket listed in lists 743, 744, 773, 774. IN other words, lists 743, 744, 773, 774 may not be synchronized and BLUETOOTH® management module 770 of agent 755 may cause events for all calls 777 in the call buffer 776 to be generated and sent based on a determination if the call 777 is associated with a bonded device, connected device or open socket listed in lists 773, 774, while BLUETOOTH® management module 740 of client application 730 may cause events for all calls 747 in the call buffer 746 to be generated and sent based on a determination if the call 747 is associated with a bonded device, connected device or open socket listed in lists 743, 744.

Similar steps may be taken for reconnect actions in action queue 749, 779. In one embodiments, the calls 747, 777 may be evaluated in association with one another and the reconnect actions in the action queue 749, 779 such that any calls or actions that may be obviated or rendered needless by a previous or subsequent call 747, 777 or action may be discarded or dropped (e.g., calls 747 may be evaluated in association with other calls 747 and reconnect actions in action queue 749 while calls 777 may be evaluated in association with other calls 777 and reconnect actions in action queue 779.

Figure 9:
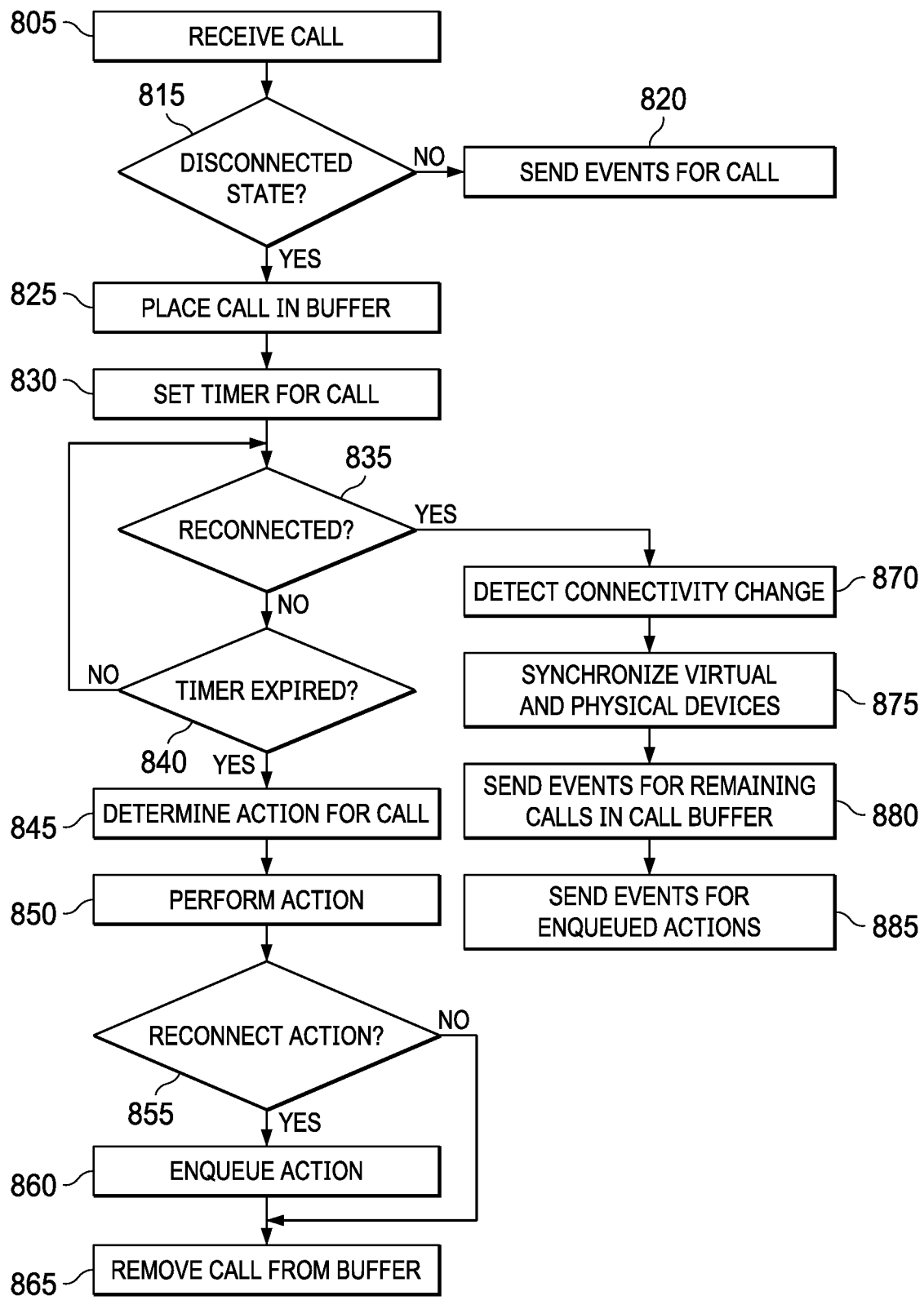
FIG. 9 depicts a diagrammatic representation of embodiments of methods for processing BLUETOOTH® calls in virtual mobile device platform.

Turning now to FIG. 9, a flow diagram for one embodiment of a method for processing incoming BLUETOOTH® calls that may be implemented by a BLUETOOTH® management module is depicted. Initially, a BLUETOOTH® call may be received (STEP 805). A connectivity state for a communication network between a client application on a mobile device and a corresponding virtual device on a virtual device platform may be maintained or determined. A connectivity status may be determined and stored at the BLUETOOTH® management module based on, for example, a heartbeat communication, a number of network errors or in another manner. If this connectivity state does not indicate a disconnected state (No Branch of STEP 815) one or more events for the received call may be generated (e.g., by a BLUETOOTH® module or an agent of a virtual mobile device platform) and sent across a communication network (STEP 820).

If, however, the connectivity state indicates a disconnected state when a BLUETOOTH® call is received (Yes Branch of STEP 815) the call is stored in the call buffer (STEP 825) and an associated timer set for the call (STEP 830). This timer may designate a temporary disconnection period associated with that call such that a flag, interrupt or other event may be raised to the BLUETOOTH® management module when the timer has expired. The duration of the timer may, for example, be dependent on the type of call or may be the same for each type of call. If the connectivity status changes to a connected state before the time has expired (Yes Branch of STEP 835) the steps for reconnection as depicted in FIG. 9 may be performed. These steps may include the generation of events for the call and the sending of these events to the mobile device or virtual device over the communication network.

If there is no reconnection before the expiration of the timer (No Branch of STEP 835,), at the expiration of the timer associated with the call (Yes Branch of STEP 840) the connection over the communication network is considered permanently disconnected with respect to that call. Accordingly, one or more corresponding actions may be determined for the call (STEP 845) and performed (STEP 850). This action may be to return a response to the call to the application or BLUETOOTH® peripheral device which originally issued the call. In one embodiment, an error may be returned in response to the call; a success or completion may be returned in response to the call; or a status may be returned in response to the call. The configuration for the calls and the action or return may be based on the operating system implemented on the virtual device and may be stored, for example, by the BLUETOOTH® management module.

It can then be determined (STEP 855) if any reconnect actions for the call should be entered into an action queue. The determination may be, for example, based on a configuration or mapping of calls with corresponding reconnect actions. If it is determined that there should be one or more reconnect actions for the call (Yes Branch of STEP 855), these reconnect actions are entered into the action queue (STEP 860). These reconnect actions for the call may be equivalent to the call or may be alternative or additional actions to that of the call. The call can then be removed from the call buffer (STEP 865). If it is determined that there are no reconnect actions for the call (NO Branch of STEP 855), the call may just be removed from the call buffer (STEP 865). The configuration for the calls and reconnect actions may be based on the operating system implemented on the virtual device and may be stored, for example, by the BLUETOOTH® management module.

During a disconnected state then, any received calls may be entered into the call buffer with an associated timer. When a call in the call buffer enters into a permanently disconnected state based on the expiration of the associated timer an action may be taken to return a response to the original call such as an error, a success or completion or a status. Additionally, one or more corresponding reconnect actions for the permanently disconnected call may be entered into action queue. The call can then be removed from the call buffer.

Referring still to FIG. 9, when the connectivity state transitions from the disconnected state to a connected state and this change is detected (STEP 870) (e.g., as determined by a heartbeat message, a number of network errors, etc.) the BLUETOOTH® components on the virtual device and the physical device may be synchronized (STEP 875). In one embodiment, lists of bonded devices and of connected devices or open sockets on each component may be exchanged between the BLUETOOTH® management modules on the virtual device and the client application on the physical device and reconciled or otherwise synchronized.

Following this synchronization, events for the calls in the call buffer may be generated (e.g., by a BLUETOOTH® module or an agent of a virtual mobile device platform) and sent across a communication network (STEP 880). In one embodiment, it can be determined for each of the calls in the call buffer whether it is associated with a bonded device, connected device or open socket listed in the maintained lists. All calls not associated with a bonded device, connected device or open socket listed in the lists may be dropped or otherwise discarded.

Similarly, events for the actions in the action queue may be generated (e.g., by a BLUETOOTH® module or an agent of a virtual mobile device platform) and sent across the communication network (STEP 885). As with the calls in the call buffer, it can be determined for each of the actions in the action queue whether it is associated with a bonded device, connected device or open socket listed in the maintained lists. All actions not associated with a bonded device, connected device or open socket listed in the lists may be dropped or otherwise discarded.

Accordingly, embodiments as disclosed herein may achieve the advantage of allowing BLUETOOTH® to be implemented in a seamless manner in a virtual mobile device system as the BLUETOOTH® components on the physical device and virtual mobile device platform may mask the virtualization of the device over a network from both applications executing on a virtual mobile device platform and BLUETOOTH® enabled peripheral devices.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

What is claimed is:

1. A system, comprising:
   a virtual device platform comprising a virtual device that is communicatively coupled to a physical device over a network,
   wherein the virtual device platform comprises one or more processors programmed with computer readable instructions that, when executed, cause the one or more processors to:
   establish a connection between the virtual device and a Bluetooth enabled device via the physical device, wherein the Bluetooth enabled device is communicatively coupled to the physical device via a wireless connection;
   exchange data between the virtual device and the Bluetooth enabled device via the physical device;
   determine a connectivity state of the network between the virtual device and the physical device, the connectivity state being a connected state or a disconnected state;
   associate the connectivity state with a timer;
   issue, by the virtual device, a call to be communicated to the Bluetooth enabled device via the physical device;
   process, by the virtual device, the call in a first manner if the connectivity state is the connected state; and
   process, by the virtual device, the call in a second manner if the connectivity state is the disconnected state, wherein processing the call in the second manner comprises:
   determining if the connectivity state has become the connected state before an expiration of the timer; and
   if the connectivity state becomes the connected state before the expiration of the timer, generating, by the virtual device, an event associated with the call and sending, by the virtual device, the event to the Bluetooth enabled device via the physical device.

2. The system of claim 1, wherein processing the call in the first manner comprises generating another event associated with the call.

3. The system of claim 1, wherein processing the call in the second manner comprises:
   if the connectivity state does not become the connected state before the expiration of the timer, determining an action for the call, wherein the action for the call comprises generating a response within the virtual device without completing the call.

4. The system of claim 3, wherein the response includes an indication of an error, a success or completion, or a status related to the call.

5. The system of claim 1, wherein the connectivity state is determined based on a heartbeat between the physical device and the virtual device over the network or a threshold number of errors or dropped packets on the network.

6. The system of claim 1, wherein if the connectivity state is the disconnected state, the one or more processors are caused to store the call in a buffer and set the timer for the call.

7. The system of claim 1, wherein a duration of the timer is determined based on an amount of time it would take to implement the call on the physical device.

8. A method, comprising:

establishing a connection between a virtual device and a Bluetooth enabled device via a physical device, wherein the virtual device is communicatively coupled to the physical device over a network and wherein the Bluetooth enabled device is communicatively coupled to the physical device via a wireless connection;

exchanging data between the virtual device and the Bluetooth enabled device via the physical device;

determining a connectivity state associated with the network between the virtual device and the physical device, the connectivity state being a connected state or a disconnected state;

associating the connectivity state with a timer;

issuing, by the virtual device, a call to be communicated to the Bluetooth enabled device via the physical device;

processing, by the virtual device, the call in a first manner if the connectivity state is the connected state; and processing, by the virtual device, the call in a second manner if the connectivity state is the disconnected state, wherein processing the call in the second manner comprises:

determining if the connectivity state has become the connected state before an expiration of the timer; and if the connectivity state becomes the connected state before the expiration of the timer, generating, by the virtual device, an event associated with the call and sending, by the virtual device, the event to the Bluetooth enabled device via the physical device.

9. The method of claim 8, wherein processing the call in the second manner further comprises:

if the connectivity state does not become the connected state before the expiration of the timer, determining an action for the call, wherein the action for the call comprises generating a response within the virtual device without completing the call.

10. The method of claim 9, wherein the response includes an indication of an error, a success or completion, or a status related to the call.

11. A non-transitory computer readable medium, comprising instructions that, when executed by one or more processors, effectuate operations comprising:

establishing a connection between a virtual device and a Bluetooth enabled device via a physical device, wherein the virtual device is communicatively coupled to the physical device over a network and wherein the Bluetooth enabled device is communicatively coupled to the physical device via a wireless connection;

exchanging data between the virtual device and the Bluetooth enabled device via the physical device;

determining a connectivity state of the network between the virtual device and the physical device, the connectivity state being a connected state or a disconnected state;

associating the connectivity state with a timer;

issuing, by the virtual device, a call to be communicated to the Bluetooth enabled device via the physical device;

processing, by the virtual device, the call in a first manner if the connectivity state is the connected state; and processing, by the virtual device, the call in a second manner if the connectivity state is the disconnected state, wherein processing the call in the second manner comprises:

determining if the connectivity state has become the connected state before an expiration of the timer; and if the connectivity state becomes the connected state before the expiration of the timer, generating, by the virtual device, an event associated with the call and sending, by the virtual device, the event to the Bluetooth enabled device via the physical device.

12. The computer readable medium of claim 11, wherein processing the call in the first manner comprises generating another event associated with the call.

13. The computer readable medium of claim 11, wherein processing the call in the second manner comprises:

if the connectivity state does not become the connected state before the expiration of the timer, determining an action for the call, wherein the action for the call comprises generating a response within the virtual device without completing the call.

14. The computer readable medium of claim 13, wherein the response includes an indication of an error, a success or completion, or a status related to the call.

* * * * *